(12) United States Patent
Levitsky et al.

(10) Patent No.: US 11,943,174 B2
(45) Date of Patent: Mar. 26, 2024

(54) DYNAMIC PARAMETER ADAPTATION FOR APERIODIC DOPPLER TRACKING SOUNDING REFERENCE SIGNAL RESOURCE SETS

(71) Applicant: QUALCOMM Incorporated, San Diego, CA (US)

(72) Inventors: Michael Levitsky, Rehovot (IL); Muhammad Sayed Khairy Abdelghaffar, San Jose, CA (US); Daniel Paz, Geva Carmel (IL)

(73) Assignee: QUALCOMM Incorporated, San Diego, CA (US)

(*) Notice: Subject to any disclaimer, the term of this patent is extended or adjusted under 35 U.S.C. 154(b) by 177 days.

(21) Appl. No.: 17/305,367

(22) Filed: Jul. 6, 2021

(65) Prior Publication Data
US 2023/0017408 A1    Jan. 19, 2023

(51) Int. Cl.
  *H04L 5/00* (2006.01)
  *H04L 27/26* (2006.01)
  *H04W 72/04* (2023.01)
  *H04W 72/23* (2023.01)

(52) U.S. Cl.
  CPC .......... *H04L 5/0096* (2013.01); *H04L 5/0048* (2013.01); *H04W 72/23* (2023.01)

(58) Field of Classification Search
  None
  See application file for complete search history.

(56) References Cited

U.S. PATENT DOCUMENTS

| | | | |
|---|---|---|---|
| 2020/0235881 A1* | 7/2020 | Choi | H04L 5/0094 |
| 2021/0314122 A1* | 10/2021 | Jin | H04L 5/005 |
| 2021/0336820 A1* | 10/2021 | Lim | H04L 5/0051 |
| 2021/0400696 A1* | 12/2021 | Maki | H04W 16/14 |
| 2022/0116965 A1* | 4/2022 | Park | H04L 5/005 |
| 2022/0132430 A1* | 4/2022 | Hoshino | H04L 5/0051 |
| 2022/0303087 A1* | 9/2022 | Sun | H04L 5/0094 |
| 2023/0017408 A1* | 1/2023 | Levitsky | H04W 72/23 |

* cited by examiner

*Primary Examiner* — Sai Aung
(74) *Attorney, Agent, or Firm* — Harrity & Harrity, LLP

(57) ABSTRACT

A base station may configure a Doppler tracking sounding reference signal (SRS) resource set with different time gaps between SRS resources of the Doppler tracking SRS resource set. However, factors influencing an optimal time gap for uplink Doppler parameter estimation may change over time and may depend on a Doppler parameter to be estimated. Therefore, parameters of an aperiodic Doppler tracking SRS resource set configuration may become suboptimal for estimating uplink Doppler parameters. Some techniques and apparatuses described herein enable dynamic parameter adaptation for aperiodic Doppler tracking SRS resource sets. The base station may dynamically adapt one or more parameters for an aperiodic Doppler tracking SRS resource set to modify a time gap and/or a number of resources or symbols to be transmitted for an aperiodic Doppler tracking SRS resource set. The base station may transmit downlink control information that indicates the one or more parameters.

30 Claims, 14 Drawing Sheets

| Scenario | Channel Type | Time gap for Doppler shift estimation | Time gap for Doppler spread estimation |
|---|---|---|---|
| HST + Train mounted UE | Slow channel time correlation decay per TRP (CDL+strong LOS channel) | Up to 6 OFDM symbols | Multiple OFDM symbols |
| HST + UE located in the train | Fast channel time correlation decay per TRP (Rician/Rayleigh channel) | 1 or 2 OFDM symbols | Approximately half of a slot |
| Mobile UE | Fast channel time correlation decay per TRP (Rayleigh channel) | 1 or 2 OFDM symbols | Approximately half of a slot |

FIG. 5

DYNAMIC PARAMETER ADAPTATION FOR APERIODIC DOPPLER TRACKING SOUNDING REFERENCE SIGNAL RESOURCE SETS

FIELD OF THE DISCLOSURE

Aspects of the present disclosure generally relate to wireless communication and to techniques and apparatuses for dynamic parameter adaptation for aperiodic Doppler tracking sounding reference signal (SRS) resource sets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

Reference signals may be used to increase the reliability and efficiency of communications between wireless devices. For example, a base station may measure a sounding reference signal (SRS), transmitted by a user equipment (UE), to select a configuration or other transmission parameters for communications between the base station and the UE. Although the base station may estimate Doppler parameters by measuring uplink reference signals from the UE 120, the estimation may be inaccurate or unreliable because the reference signals transmitted by the UE 120 may be ill-suited for Doppler parameter estimation. For example, the temporal spacing between repetitions of a reference signal may be too large, small, or inconsistent for an accurate Doppler parameter estimation given the channel characteristics, signal-to-noise ratio (SNR), UE speed range, subcarrier spacing, and/or carrier frequency applicable for the uplink transmissions from the UE. Different temporal spacing between repetitions of a reference signal (e.g., an SRS) may be needed for estimation of different Doppler characteristics (Doppler shift and/or Doppler spread). Therefore, in some cases, the base station may configure a Doppler tracking SRS resource set with different time gaps between SRS resources of the Doppler tracking SRS resource set.

However, in some cases, channel conditions, channel parameters, SNR conditions, UE speeds, and/or deployment parameters (e.g., subcarrier spacing and carrier frequency) may change dynamically over time. Therefore, parameters of a Doppler tracking SRS resource set configuration, such as for an aperiodic Doppler tracking SRS resource set configuration, may become suboptimal for estimating uplink Doppler parameters. In the case that a different Doppler parameters are targeted for estimation using a Doppler tracking SRS at different time periods, a different number of SRS symbols or SRS resources (e.g., with a different time gaps between the SRS symbols or SRS resources) may be required to minimize SRS overhead or to maximize efficiency of the Doppler tracking SRS usage. For example, a number of SRS resources and/or a time gap between SRS resources of an aperiodic Doppler tracking SRS resource set may become suboptimal due to changing channel conditions, channel parameters, SNR conditions, UE 120 speeds, and/or deployment parameters. Reconfiguring the aperiodic Doppler tracking SRS resource set based on the changing conditions and/or to align the aperiodic Doppler tracking SRS with Doppler parameter(s) targeted for estimation may be difficult and time consuming. For example, the aperiodic Doppler tracking SRS resource set may be reconfigured via radio resource control (RRC) signaling. However, RRC procedures may be unable to adapt to a rate at which reconfigurations may be needed for the aperiodic Doppler tracking SRS resource set. For example, because RRC reconfiguration procedures are non-synchronous and associated with high latency and as a result involve some ambiguity period that may requires an interruption to aperiodic SRS triggering (e.g., for the RRC reconfiguration) every time that a parameter associated with the aperiodic Doppler tracking SRS resource set should be changed. Therefore, it may be difficult to dynamically adapt parameters of the Doppler tracking SRS to optimize time gaps and/or a number of SRS resources associated with the Doppler tracking SRS.

Some techniques and apparatuses described herein enable dynamic parameter adaptation for aperiodic Doppler tracking SRS resource sets. For example, the base station may dynamically adapt one or more parameters for an aperiodic Doppler tracking SRS resource set to modify a time gap (e.g., between two resources or symbols associated with the aperiodic Doppler tracking SRS resource set) and/or a number of resources or symbols to be transmitted for an aperiodic Doppler tracking SRS resource set. The base station may transmit a DCI message that indicates the one or more parameters. In some aspects, the DCI may indicate an SRS trigger state. The SRS trigger state may indicate an aperiodic Doppler tracking SRS resource set. In some aspects, the SRS trigger state may indicate one or more parameters associated with the aperiodic SRS resource set (e.g., explicitly based at least in part on a configuration of the SRS trigger state). Alternatively, the DCI may indicate the triggered SRS trigger state (e.g., that is linked or associated with the aperiodic Doppler tracking SRS resource set) and may indicate the one or more parameters associated with the aperiodic SRS resource set. In this way, the base station may be enabled to modify a time gap between SRS resources associated with the aperiodic Doppler tracking SRS resource set and/or may be enabled to modify a number of SRS resources to be transmitted for the aperiodic Doppler tracking SRS resource set. As a result, uplink Doppler parameter estimations performed using the aperiodic Doppler tracking SRS may be improved by dynamically adapting a time gap between SRS resources (e.g., based at least in part on Doppler parameter(s) to be estimated, channel conditions, channel parameters, SNR conditions, UE speeds, and/or deployment parameters) to optimize the time gap(s) and/or number of transmitted SRS symbols or SRS resources for different scenarios. This may improve an accuracy and reliability of Doppler parameter estimations by enabling the base station to configure different time gaps or pilot spacings between SRS resources (e.g., for different Doppler parameter estimations) within the same triggered Doppler tracking SRS resource set. Additionally, to reduce an overhead associated with transmitting a Doppler tracking SRS (e.g., an SRS overhead), the base station may be enabled to dynamically indicate different numbers of SRS resources or SRS symbols that may be required to support different estimations at different time periods.

Some aspects described herein relate to a UE for wireless communication. The user equipment may include a memory and one or more processors coupled to the memory. The one or more processors may be configured to receive configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. The one or more processors may be configured to receive downlink control information (DCI) triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The one or more processors may be configured to transmit the SRS resource set based at least in part on the one or more parameters.

Some aspects described herein relate to a base station for wireless communication. The base station may include a memory and one or more processors coupled to the memory. The one or more processors may be configured to transmit, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. The one or more processors may be configured to transmit, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The one or more processors may be configured to receive, from the UE, the SRS resource set based at least in part on the one or more parameters.

Some aspects described herein relate to a method of wireless communication performed by a UE. The method may include receiving configuration information for an SRS resource set, wherein the configuration information indicates a Doppler tracking usage type for the SRS resource set, that the SRS resource set is an aperiodic SRS resource set, and a configuration for one or more SRS resource identifiers. The method may include receiving DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The method may include transmitting the SRS resource set based at least in part on the one or more parameters.

Some aspects described herein relate to a method of wireless communication performed by a base station. The method may include transmitting, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers. The method may include transmitting, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The method may include receiving, from the UE, the SRS resource set based at least in part on the one or more parameters.

Some aspects described herein relate to a non-transitory computer-readable medium that stores a set of instructions for wireless communication by a UE. The set of instructions, when executed by one or more processors of the UE, may cause the UE to receive configuration information for an SRS resource set, wherein the configuration information indicates a Doppler tracking usage type for the SRS resource set, that the SRS resource set is an aperiodic SRS resource set, and a configuration for one or more SRS resource identifiers. The set of instructions, when executed by one or more processors of the UE, may cause the UE to receive DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The set of instructions, when executed by one or more processors of the UE, may cause the UE to transmit the SRS resource set based at least in part on the one or more parameters.

Some aspects described herein relate to a non-transitory computer-readable medium that stores a set of instructions for wireless communication by a base station. The set of instructions, when executed by one or more processors of the base station, may cause the base station to transmit, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers. The set of instructions, when executed by one or more processors of the base station, may cause the base station to transmit, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The set of instructions, when executed by one or more processors of the base station, may cause the base station to receive, from the UE, the SRS resource set based at least in part on the one or more parameters.

Some aspects described herein relate to an apparatus for wireless communication. The apparatus may include means for receiving configuration information for an SRS resource set, wherein the configuration information indicates a Doppler tracking usage type for the SRS resource set, that the SRS resource set is an aperiodic SRS resource set, and a configuration for one or more SRS resource identifiers. The apparatus may include means for receiving DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The apparatus may include means for transmitting the SRS resource set based at least in part on the one or more parameters.

Some aspects described herein relate to an apparatus for wireless communication. The apparatus may include means for transmitting, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers. The apparatus may include means for transmitting, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The apparatus may include means for receiving, from the UE, the SRS resource set based at least in part on the one or more parameters.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 5 is a diagram illustrating an example of uplink Doppler parameter estimation considerations.

DETAILED DESCRIPTION

Figure 1:
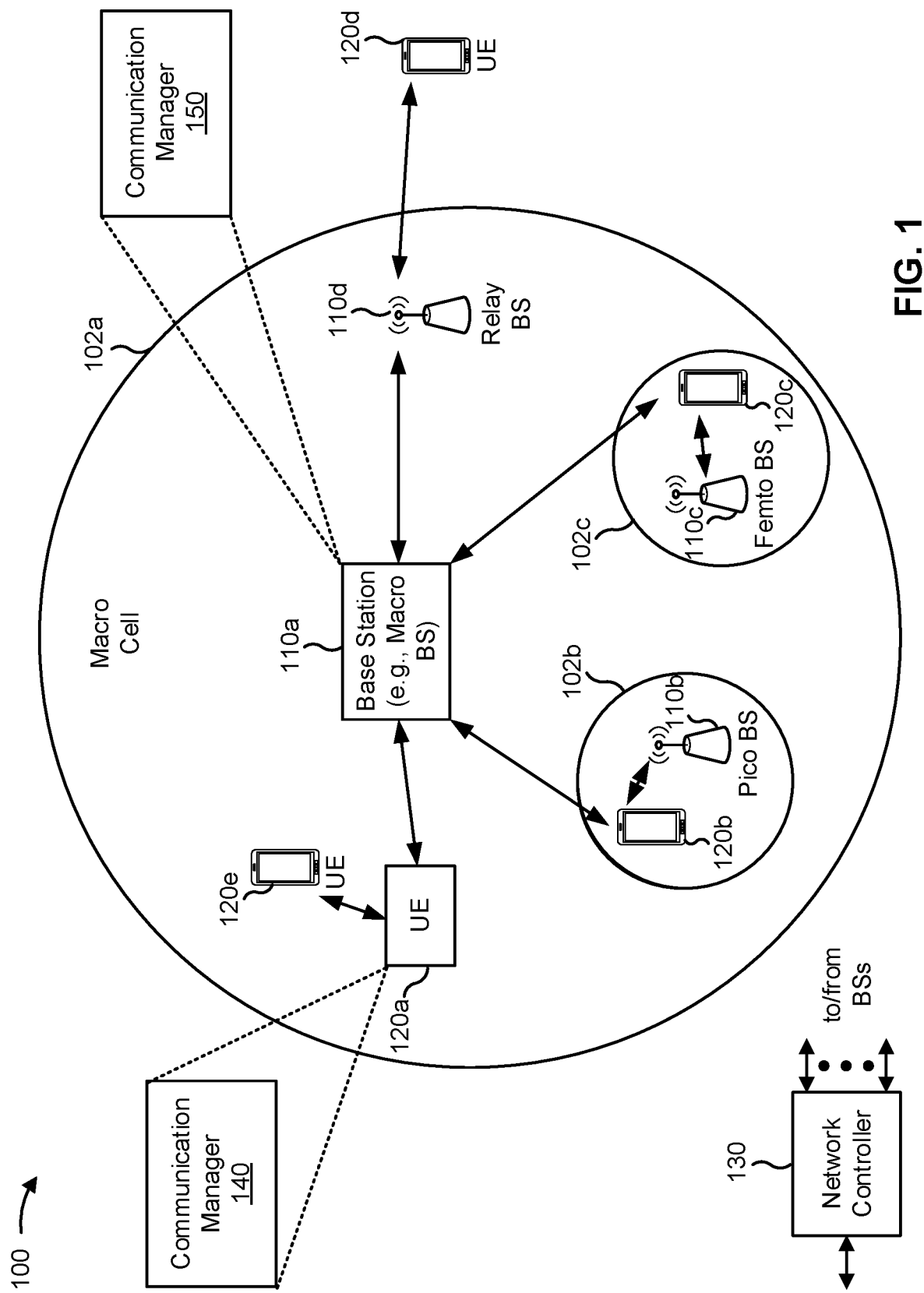
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information for a sounding reference signal (SRS) resource set, wherein the configuration information indicates a Doppler tracking usage type for the SRS resource set, that the SRS resource set is an aperiodic SRS resource set, and a configuration for one or more SRS resource identifiers associated with the SRS resource set; receive downlink control information (DCI) triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and transmit the SRS resource set based at least in part on the one or more parameters. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set; transmit, to the UE 120, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and receive, from the UE 120, the SRS resource set based at least in part on the one or more parameters. Additionally, or alternatively, the communication manager 150 may perform one or more other operations described herein.

As indicated above, FIG. 1 is provided as an example. Other examples may differ from what is described with regard to FIG. 1.

Figure 2:
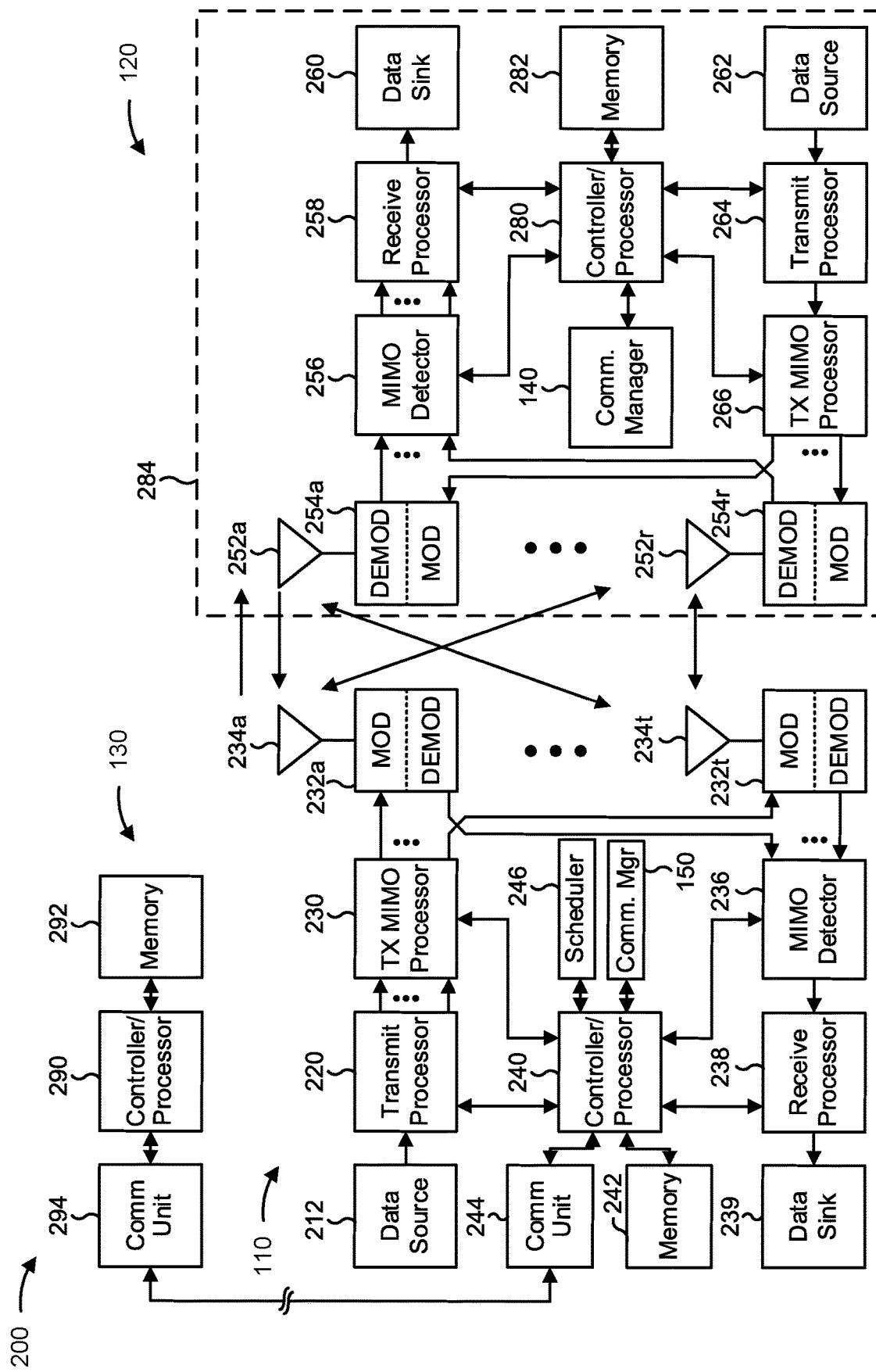
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with dynamic parameter adaptation for aperiodic Doppler tracking SRS resource sets, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set; means for receiving DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and/or means for transmitting the SRS resource set based at least in part on the one or more parameters. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set; means for transmitting, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and/or means for receiving, from the UE, the SRS resource set based at least in part on the one or more parameters. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
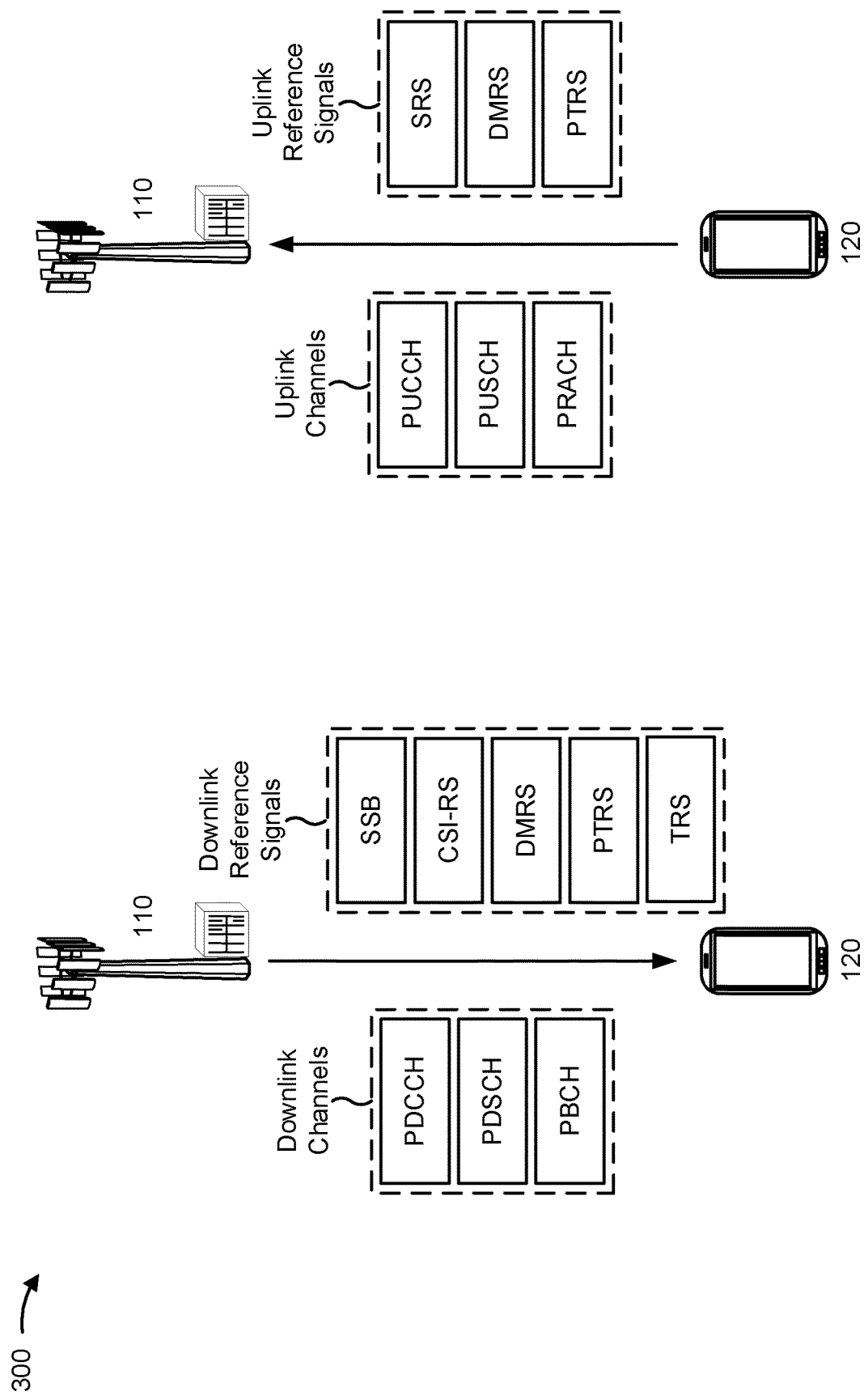
FIG. 3 is a diagram illustrating an example of physical channels and reference signals in a wireless network.

FIG. 3 is a diagram illustrating an example 300 of physical channels and reference signals in a wireless network. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), a phase tracking reference signal (PTRS), and/or a tracking reference signal (TRS), among other examples. As also shown, an uplink reference signal may include an SRS, a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A TRS may be a downlink reference signal (not shown in FIG. 3) and may carry information used to assist in time domain and frequency domain tracking. The TRS may be used to track transmission path delay spread and/or Doppler spread. A TRS may be UE-specific. In some aspects, a TRS may be transmitted in a TRS burst. A TRS burst may consist of four OFDM symbols in two consecutive slots. In some aspects, a TRS may be associated with one or more CSI-RS configurations. For example, a TRS burst may use one or more CSI-RS resources.

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage (e.g., as described in more detail elsewhere herein. In some examples, an SRS may be used for uplink CSI acquisition, downlink CSI acquisition for reciprocity-based operations, and/or uplink beam management, among other examples. The base station 110 may measure the SRSs, may perform channel estimation based at least in part on the measurements, and may use the SRS measurements to configure communications with the UE 120.

Reference signals may be used to increase the reliability and efficiency of communications between wireless devices. For example, a base station 110 may measure an uplink reference signal to select a configuration or other transmission parameters for communications between the base station 110 and a UE 120. For example, the base station 110 may measure an uplink reference signal to estimate a delay spread, SNR, and/or a Doppler parameter (e.g., Doppler shift or Doppler spread) associated with the uplink channel, among other examples.

"Doppler shift" refers to a shift or change in a frequency of a signal between a transmitter and a receiver. Doppler shift may sometimes be referred to as a frequency offset. For example, Doppler shift may occur when a transmitter of a signal is moving in relation to the receiver. The relative movement may shift the frequency of the signal, making the frequency of the signal received at the receiver different than the frequency of the signal transmitted at the transmitter. In other words, the frequency of the signal received by the receiver differs from the frequency of the signal that was originally emitted. "Doppler spread" refers to the widening of a spectrum of a narrow-band signal transmitted through a multipath propagation channel. Doppler spread may be caused by different Doppler shifts associated with the multiple propagation paths when there is relative motion between the transmitter and the receiver. For example, when there is no relative motion between the transmitter and the receiver, due to the multipath propagation channel, the receiver can receive the same signal at different times, because one copy of the signal uses a shorter path and arrives quickly, whereas another copy of the signal may user a longer path. Where there is relative motion between the transmitter and the receiver, signals on the different paths may arrive at the receiver at different times and with different frequencies (e.g., due to different Doppler shifts associated with each path). Doppler spread may be a measure of a difference in frequencies of signals on the paths associated with the multipath propagation channel. Doppler spread may sometimes be referred to as a channel time correlation or a channel time coherency characteristic for a multipath propagation channel.

In some examples, such as in a high mobility environments (e.g., environments in which the UE 120 is traveling at high rates of speed, such as 500 kilometers per hour (km/h) or similar speeds), accurate Doppler parameter (e.g. Doppler shift) estimation may be needed for efficient Doppler pre-compensation, such as in a case of a multi TRP transmission to a UE in downlink. For example, in a high speed train (HST) scenario (e.g., where the UE 120 is mounted on a train or is location inside of a train), the base station 110 may pre-compensate for a Doppler shift experienced due to the high rate of speed (e.g., the base station 110 may apply Doppler shift pre-compensation for each TRP based on a Doppler shift reported, indicated to, or measured by the base station 110. In some cases, the base station 110 may apply Doppler shift pre-compensation based on implicit reporting of the Doppler shift by a UE 120 where the UE 120 transmits reference signals (e.g., SRSs) using a frequency offset corresponding to, or defined, based on a Doppler shift measured (e.g., by the UE 120) using one or more TRSs associated with one or more TRPs involved in a downlink transmission. Therefore, in some cases, the base station 110 may determine a Doppler shift pre-compensation for multi TRP transmission in downlink based on an SRS transmission (and the corresponding Doppler shift measurements based on the SRS by different TRPs) from the UE 120.

However, Doppler parameters for the uplink channel ("uplink Doppler parameters"), such as a Doppler shift or a Doppler spread, may not be known, which may prevent the base station 110 from selecting an uplink DMRS configuration that is properly tailored to the conditions of the uplink channel or from accurately pre-compensating for the Doppler parameters experienced by a UE 120. Although the base station 110 may estimate Doppler parameters by measuring uplink reference signals from the UE 120, the estimation may be inaccurate or unreliable because the reference signals transmitted by the UE 120 may be ill-suited for Doppler parameter estimation. For example, the temporal spacing between repetitions of a reference signal may be too large, small, or inconsistent for an accurate Doppler parameter estimation given the channel characteristics, SNR, UE speed range, subcarrier spacing and carrier frequency applicable for the uplink transmissions from the UE 120.

Moreover, different Doppler parameter estimation may require different temporal spacings between repetitions of a reference signal. For example, in scenarios where Doppler shift estimation is relevant (e.g., in high mobility scenarios, such as an HST scenario) and where meaningful Doppler spread is also experienced, it may be beneficial to estimate the uplink Doppler shift based on a relatively small time gap between repetitions of a reference signal (e.g., to enable the base station 110 to decorrelate the Doppler shift estimation from the time coherency decay caused by the Doppler spread experienced). Conversely, a reliability of a Doppler spread estimation may be improved by using a time gap of multiple symbols (e.g., based on a channel profile, UE 120 speed, and/or other parameters). Therefore, in scenarios where a base station 110 is to estimate both uplink Doppler shift and uplink Doppler spread (such as an HST scenario) using an uplink reference signal (such as an SRS), different time gaps between repetitions of the uplink reference signal may be required for estimating the different Doppler parameters. Additionally, as channel parameters or deployment parameters (e.g., a subcarrier spacing used by the UE 120 or a carrier frequency used by the UE 120) change, a proper time gap for uplink Doppler parameter estimation may change. Therefore, it may be difficult to configure or dynamically update an uplink reference signal resource set only with two SRS resources or symbols with a fixed time gap between them to enable a base station 110 to properly estimate multiple Doppler parameters in different scenarios using the same uplink reference signal.

As indicated above, FIG. 3 is provided as an example. Other examples may differ from what is described with regard to FIG. 3.

Figure 4:
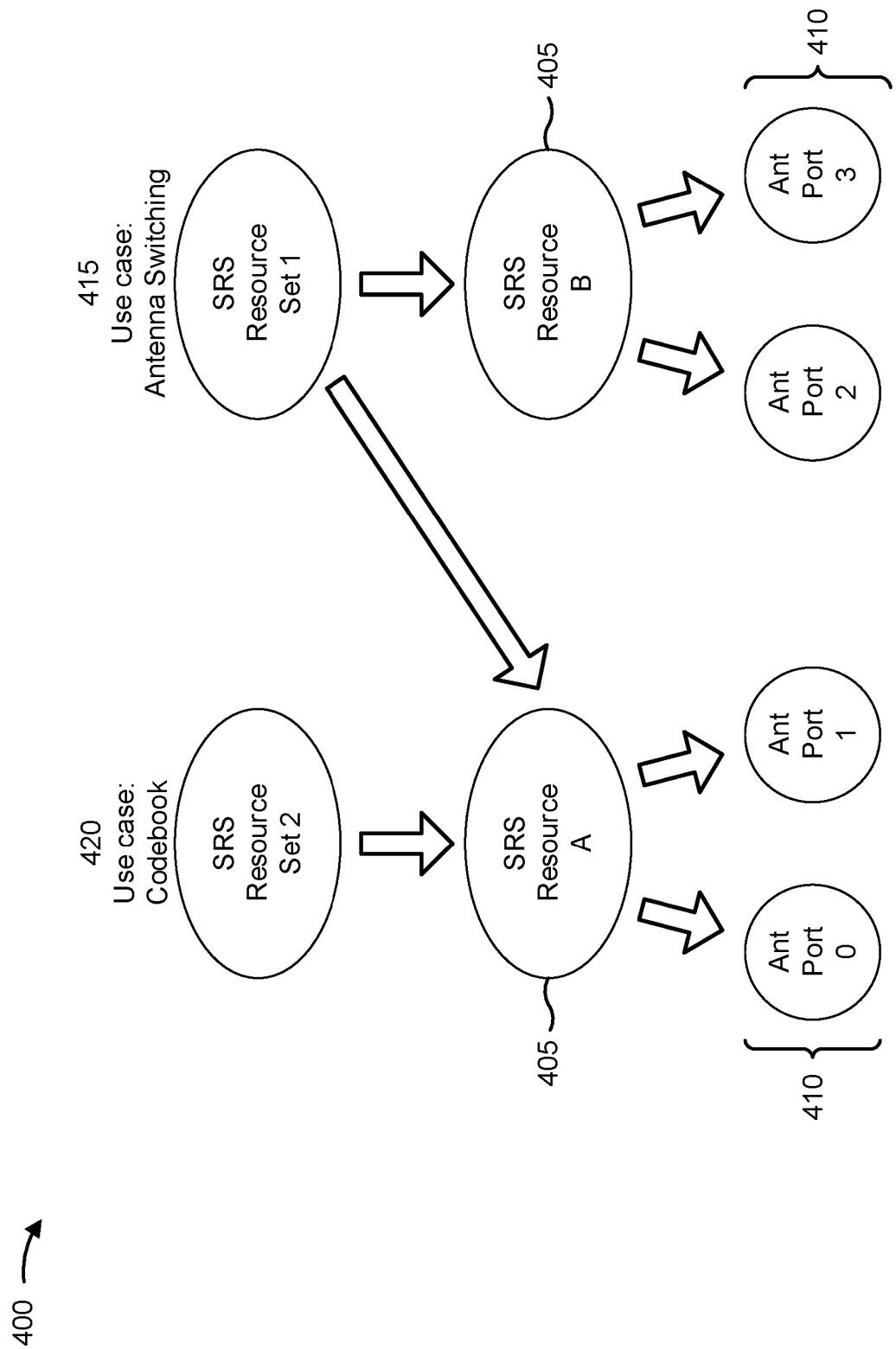
FIG. 4 is a diagram illustrating an example of sounding reference signal (SRS) resource sets.

FIG. 4 is a diagram illustrating an example 400 of SRS resource sets. A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). At 405, an SRS resource set may include one or more resources (e.g., shown as SRS resources), which may include time resources and/or frequency resources (e.g., a slot, a symbol, a resource block, and/or a periodicity for the time resources).

At 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case or type (e.g., in an SRS-SetUse information element or an SRS-ResourceSet information element) for the SRS resource set. For example, an SRS resource set may have a usage type of antenna switching, codebook, non-codebook, beam management, and/or positioning.

An antenna switching SRS resource set may be used to measure downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to assist in acquiring uplink CSI by the base station when a base station 110 indicates an uplink precoder to the UE 120 (e.g., codebook based PUSCH). For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to assist in selection of transmission parameters for uplink (e.g. number of layers, precoding and/or MCS). In this case, the non-codebook SRS may be precoded using a precoder selected by the UE 120 (e.g., which may be implicitly indicated to the base station 110 through different hypotheses of the precoded uplink layers transmitted over the non-codebook based SRS ports). A beam management SRS resource set may be used to assist in UL beam management decisions for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different usage configuration) may overlap (e.g., in time and/or in frequency, such as in the same slot). For example, at 415, a first SRS resource set (e.g., shown as SRS Resource Set 1) is shown as having an antenna switching usage or type. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

At 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some cases, a base station 110 may compensate for a Doppler shift experienced by a UE 120 on signals transmitted by multiple TRPs simultaneously on the same resources in high mobility environments based on estimating the uplink Doppler shift using an SRS transmitted by the UE 120 (e.g., an implicit Doppler shift signaling or indication). A Doppler shift estimation using two repetitions of an SRS with a temporal spacing assumes that the two repetitions experience approximately the same channel (e.g., that the channels experienced by the two repetitions have a time correlation of approximately 1). Therefore, a temporal spacing (e.g., a time gap) between repetitions of an SRS used to estimate uplink Doppler shift may be based on a channel type (e.g., because the channel type may impact time correlation behavior), a Doppler spread (or time coherence) associated with the channel, a speed of the UE 120, and/or a possibility of Doppler shift aliasing or phase ambiguity in time, SNR among other examples (as described in more detail below). However, repetitions of SRSs (e.g., the existing SRS configurations) may be improperly spaced for Doppler shift estimation, which may result in an inaccurate Doppler shift estimation that negatively impacts the pre-compensation of the Doppler shift in downlink by the base station 110 based on Doppler shift estimations associated with the channel of each TRP.

As indicated above, FIG. 4 is provided as an example. Other examples may differ from what is described with regard to FIG. 4.

FIG. 5 is a diagram illustrating an example 500 of uplink Doppler parameter estimation considerations. As described above, a base station 110 may use uplink Doppler parameters, among other factors, as a basis for selecting an appropriate uplink DMRS configuration that allows an increase in the spectral efficiency of the link. In some examples, the base station may determine the Doppler spread for an uplink channel based on the correlation in time between two repetitions of an uplink reference signal. The correlation in time (also referred to as "correlation" or a "time correlation parameter") between two repetitions of a reference signal may be determined by measuring corresponding aspects of two repetitions of a reference signal.

"Repetitions of a reference signal" may refer to repeated transmissions of the same reference signal. In some examples (e.g., when referring to an SRS), repetitions of a reference signal may be referred to herein as pilots or pilot signals, and the resources used to carry the pilot signals (or reserved for carrying the pilot signals) may be referred to as pilot resources or pilot symbols. The temporal spacing between reference signal repetitions may be referred to herein as repetition spacing, pilot spacing (e.g., for SRS), and/or a reference signal spacing configuration, among other examples.

To increase the accuracy of a Doppler spread estimation, a base station 110 may average the correlations of multiple pairs of reference signals that share a common repetition spacing. However, such a technique may be ineffective if the repetition spacing between pairs of reference signals is inconsistent. The suitability of repetition spacing for Doppler spread estimation may vary with the communication parameters used by the UE 120. For example, the repetition spacing that is suitable for Doppler spread estimation may vary with the channel type/characteristics (e.g. LOS, non-LOS (NLOS), directional channel, single frequency network (SFN) channel, Rayleigh, and/or Rician), UE speeds range, subcarrier spacing and carrier frequency used by the UE 120 to transmit the reference signal. The subcarrier spacing and carrier frequency used by a UE 120 may be configured for the UE 120 by the network based on capabilities of the UE 120. A repetition spacing may be considered suitable for Doppler spread estimation if the resulting correlation (e.g., channel time correlation) between reference signal repetitions is within an acceptable threshold range (e.g., a time correlation parameter may need to be maintained between 0.4 and 1, to enable the resulting Doppler spread estimation to be done reliably). Table 1 provides an example of suitable repetition spacing for a reference signal, given certain non-limiting pairings of subcarrier spacing and carrier frequency and with a Rayleigh channel type assumption. "Subcarrier spacing" may refer to the frequency gap between subcarriers used for communications between a base station and a UE 120. "Carrier frequency" may refer to a frequency band used for communications between a base station 110 and a UE 120.

TABLE 1

| Pilot Spacing | Subcarrier Spacing | Carrier Frequency |
| --- | --- | --- |
| 3-4 OFDM symbols | 15 kHz | 6 GHz |
| 6-7 OFDM symbols | 30 kHz | 6 GHz |
| 12-13 OFDM symbols | 60 kHz | 6 GHz |

In some examples, a base station 110 may estimate the uplink Doppler spread for a channel by measuring a DMRS or an SRS. For example, the base station 110 may measure two DMRS repetitions or symbols to determine the uplink Doppler spread, or the base station 110 may measure two SRS repetitions to determine the uplink Doppler spread. However, Doppler spread estimation using a DMRS may be inaccurate because the spacing between DMRS repetitions varies with PUSCH allocations, DMRS bandwidth depends on a PUSCH allocation bandwidth, DMRS availability depends on PUSCH scheduling and hence may result in unreliable or inconsistent correlation values. Additionally, or alternatively, there may be only one DMRS symbol in a PUSCH allocation, which prevents correlation altogether. Moreover, the suitability of SRS for accurate Doppler spread estimation may be limited to certain communication scenarios (e.g., limited to a subset of possible subcarrier spacing, carrier frequency, channel type and UE speed range combinations) because the network may only support a limited quantity of SRS repetition spacing options. As a result, to configure multiple time gaps between SRS resources or SRS symbols may require a high SRS overhead (e.g., may require a high number of SRS resources to be configured for the UE 120).

For example, an SRS configuration supported by the network may include four SRS repetitions transmitted consecutively (e.g., transmitted in consecutive SRS symbols). Thus, the maximum spacing between SRS repetitions may be three symbols, which means the SRS configuration may be suitable for reliable Doppler spread estimation (e.g., in the case of a Rayleigh channel assumption) when the UE 120 uses a subcarrier spacing of 15 kHz and a carrier frequency of 6 GHz, but not when the UE 120 uses other combinations of subcarrier spacing and carrier frequency. As another example, an SRS configuration supported by a base station 110 and a UE 120 may include two SRS repetitions transmitted in the last symbol of the first slot or subframe and in the first valid SRS location of the next slot or subframe (e.g., two consecutive uplink slots or subframes). Thus, the minimum spacing between SRS repetitions may be nine symbols (assuming a fourteen-symbol slot), which means that this SRS configuration may be unsuitable for reliable Doppler spread estimation (e.g., in the case of Rayleigh channel assumption) when the UE 120 uses any combination of subcarrier spacing and carrier frequency in Table 1.

Therefore, in some cases, a base station 110 may further improve the accuracy of a Doppler spread estimation (e.g., to improve the DMRS configuration selection). In such scenarios, the base station 110 may estimate the uplink Doppler spread by using an SRS configuration with a repetition spacing that suits the subcarrier spacing and carrier frequency used by the UE 120. The base station 110 may configure the SRS for the Doppler spread estimation instead of the DMRS because the timing of SRS repetitions is independent of PUSCH scheduling and thus more flexible. In some examples, each SRS repetition may occupy a set of resource elements in a symbol, and the resource elements for different repetitions may span the same frequency band. For example, an SRS configuration may include intra-slot SRS repetitions (e.g., where multiple SRS resources are included in the same slot).

However, as described above, a temporal spacing (e.g., a time gap) between repetitions of an SRS used to accurately and reliably estimate Doppler spread may be different than a temporal spacing needed to accurately and reliably estimate a Doppler shift. For example, the base station 110 may estimate or measure a phase difference ($\Delta\theta$) related to the Doppler shift between repetitions of an SRS. For example, $\Delta\theta = 2\pi \times f_{Doppler\ shift} \times \Delta T$, where $f_{Doppler\ shift}$ is the frequency offset associated with the Doppler shift and $\Delta T$ is the temporal offset (or time gap) between the repetitions of the SRS. The Doppler shift estimation by the base station 110 may assume that the two repetitions experience approximately the same channel. In other words, the equation $\Delta\theta = 2\pi \times f_{Doppler\ shift} \times \Delta T$ may assume that the time correlation of the channel between the repetitions of the SRS is equal to 1 (e.g., may assume that the channel experienced by the first repetition and the channel experienced by the second repetition are fully correlated in time). This assumption may hold true when the channel is not experiencing fading, such as where a directional channel with a dominant path of the signal (for example associated with a direct line of sight (LOS) between the transmitter and the receiver) or in any other case where there is no significant multipath (e.g. a LOS channel), because time coherency may be preserved for the channel between the two repetitions of the SRS for these channel scenarios. In such examples, it may be beneficial to use a larger time gap between the repetitions in order to minimize a Doppler shift estimation error. For example, this can be concluded by observing an estimation error variance bound (e.g., a Cramer-Rao lower bound (CRLB) expression for frequency offset estimation) that may be improved if a larger time gap between the repetitions is used, such that a larger time gap may allow for a lower estimation error variance bound.

However, if the channel is a non-LOS channel, or if the channel is experiencing fading, then the time coherency of the channel may be limited over time (e.g., a time coherency may only be maintained for the channel for a short period of time). For example, if the channel is a multipath channel, the channel may experience a Doppler spread, which may result in a time coherence of the channel not being maintained between repetitions of an SRS. Therefore, to ensure that time coherence between the repetitions is maintained, a small time gap may be needed between the repetitions to accurately and reliably estimate Doppler shift (e.g., to ensure that a Doppler spread of the channel does not impact the estimation of the Doppler shift).

A maximum time gap that can be used between the repetitions for Doppler shift estimation may be limited by a phase ambiguity or Doppler shift aliasing. For example, phase ambiguity or Doppler shift aliasing may require that $|\Delta\theta = 2\pi \times f_{Doppler\ shift} \times \Delta T| < \pi$, such that $$f_{Doppler\ shift} < \frac{1}{2\Delta T}$$

to ensure that the phase difference is maintained on a single cycle of the phase (e.g., if the phase difference ($\Delta\theta$) is greater than $\pi$, the cycle of phase with which the phase difference is associated may be unclear). Example permissible pilot spacings (e.g., time gaps between repetitions of an SRS) in accordance with the phase ambiguity or Doppler shift aliasing are shown below in Table 2. The examples shown in Table 2 assume an LOS channel, a subcarrier spacing of 30 kHz, and a carrier frequency of 4.5 GHz.

TABLE 2

| UE Speed | Doppler Shift | Permissible Pilot Spacing |
| --- | --- | --- |
| 500 km/h | 2083 Hz | 6 OFDM symbols |
| 300 km/h | 1250 Hz | 11 OFDM symbols |
| 200 km/h | 833 Hz | 16 OFDM symbols |

As shown in Table 2, as a speed of the UE 120 increases, the Doppler shift experienced by the UE 120 may also increase. As a result, as the UE 120 speed increases, permissible pilot spacings (e.g., maximum time gaps between repetitions of an SRS) may decrease, to mitigate phase ambiguity or Doppler shift aliasing. For example, at a UE 120 speed of 500 km/h, a permissible pilot spacing may be limited to 6 OFDM symbols, whereas at a UE 120 speed of 200 km/h, a permissible pilot spacing may be limited to 16 OFDM symbols. Correspondingly, time gap selection for Doppler shift estimation may be done adaptively per scenario in order to achieve an improved estimation accuracy and reliability. For example, at lower UE 120 speeds, a larger time gap between repetitions of an SRS may be used for improved accuracy of Doppler shift estimation by a base station 110. Therefore, in high mobility scenarios, such as an HST scenario, a configuration of the SRS resource set may need to take a speed of the UE 120 into account to ensure that the Doppler shift estimation mitigates a risk of phase ambiguity or Doppler shift aliasing.

As described above, a time gap (or pilot spacing) for Doppler spread estimation may be selected to ensure that a time correlation parameter for the channel is maintained between 0.4 and 1 to enable the resulting Doppler spread estimation to be done reliably. The time correlation parameter may be based at least in part on a channel type, channel parameters, a UE 120 speed, and/or deployment parameters (e.g., subcarrier spacing and/or carrier frequency), among other examples. For example, for a Rayleigh channel type, to ensure that the time correlation parameter is maintained between 0.4 and 1, it may be beneficial to use a different time gap (e.g., a different pilot spacing) for different deployment parameters (e.g., as indicated in Table 1). In some cases, a deployment may assume a certain channel type. For example, an HST SFN deployment may assume a clustered delay line (CDL) channel type with a dominant LOS path that is assumed as a typical case for each TRP (e.g., as the HST SFN may assume a train mounted UE 120, rather than other possible scenarios). However, an uplink channel experienced in the HST SFN deployment may be similar to a Rician channel type or channel model (e.g., that assumes that a dominant signal may be a phasor sum of two or more dominant signals). Additionally, a UE 120 that is located inside of a train in an HST SFN deployment may experience an uplink channel that may be similar to a Rayleigh channel type or channel model (e.g., that assumes there is no dominant LOS path). In some examples, a Rayleigh channel type or channel mode may be a case of a Rician channel when there is no LOS signal. Therefore, a specific fixed time gap (or pilot spacing) for Doppler spread estimation may be not appropriate for all the scenarios or may be limiting and may need to be selected adaptively per scenario to ensure accurate Doppler spread estimation (e.g., to enable uplink DMRS selection or to be used for other uplink configuration or demodulation/processing aspects).

As a result, to accurately measure or estimate both Doppler shift and Doppler spread, two different time gaps (e.g., two different pilot spacings) may be needed. Moreover, to accurately estimate Doppler spread, a Doppler shift estimation may need to be performed first by a base station 110 (e.g., to remove a frequency offset associated with the common Doppler shift when estimating the Doppler spread). Therefore, two different measurements may be needed by the base station 110 to estimate both Doppler shift and Doppler spread. Additionally, the most convenient time gap selection for Doppler shift or Doppler spread estimation should be done adaptively per scenario depending on the channel type, SNR, deployment parameters and UE speed range.

For example, as shown in FIG. 5, the table 505 depicts different scenarios and corresponding different time gaps (e.g., for different Doppler parameter estimations). Information depicted in the table 505 assumes a UE speed of 500 km/h, a subcarrier spacing of 30 kHz, and a carrier frequency of 4.5 GHz. The table 505 depicts examples of different possible configurations in different scenarios to optimize uplink Doppler spread and uplink Doppler shift estimations by a base station 110. For example, in an HST scenario where the UE 120 is a train mounted UE (e.g., is mounted or deployed in a fixed position on the outside of a train), a channel type may be associated with a slow channel time correlation decay per TRP (for each TRP). In other words, a time correlation for the channel may be maintained over a longer period of time (e.g., as the UE 120 may be associated with additional antennas and/or may have an improved LOS to a TRP). Therefore, a time gap for an uplink Doppler shift estimation may be configured to be up to 6 OFDM symbols (e.g., assuming a UE 120 speed of 500 km/h; other possible time gaps for other UE 120 speeds are shown in Table 2). A time gap for an uplink Doppler spread estimation may be configured to be multiple OFDM symbols to ensure improved time correlation resolution for different UE 120 speeds. In an HST scenario where the UE 120 is located inside the train (e.g., is not a train mounted UE), a channel type may be Non-LOS channel (e.g., the UE may not have a direct line of sight to a TRP) and may be associated with a fast channel time correlation decay per TRP (for each TRP). In other words, a time correlation for the channel may not be maintained over longer periods of time, such as over multiple symbols or a slot. Therefore, a time gap for an uplink Doppler shift estimation may be configured to be 1 or 2 OFDM symbols to ensure that a time correlation between the repetitions of the SRS is maintained. Additionally, a time gap for an uplink Doppler spread estimation may be configured to be approximately half a slot (e.g., assuming a Rayleigh channel type) to ensure improved time correlation resolution for different UE 120 speeds (e.g., examples of time gaps for different deployment scenarios are shown above in Table 1). In a scenario in which the UE 120 is a mobile UE with a single TRP transmission (e.g., and not in case of a special HST SFN deployment with TRPs densely distributed along the railway track). For example, a mobile UE may be moving on highway and experiencing a fading Non-LOS channel with an FR1 deployment, and/or may be experiencing a channel type associated with a fast channel time correlation decay. In other words, a time correlation for the channel may not be maintained over longer periods of time, such as over multiple symbols or a slot. Therefore, a time gap for an uplink Doppler shift estimation may be configured to be 1 or 2 OFDM symbols to ensure that a time correlation between the repetitions of the SRS is maintained. Additionally, a time gap for an uplink Doppler spread estimation may be configured to be approximately half a slot (e.g., with a Rayleigh channel type assumption) to ensure improved time correlation resolution for different UE 120 speeds (examples of time gaps for different deployment scenarios are shown above in Table 1).

As a result, different channel types, different channel parameters, SNR conditions, different UE 120 speeds, and/or different deployment parameters may be associated with different optimal time gaps for uplink Doppler parameter estimation. For example, a different time gap between repetitions of an SRS may be configured, depending on a Doppler parameter to be measured, a channel type, one or more channel parameters, a speed of the UE 120, and/or one or more deployment parameters. However, current SRS configurations may be limited in a permissible repetition spacing (e.g., repetitions for an SRS resource may be permissible only on consecutive symbols) and/or a number of SRS resources or symbols that can be configured in each slot in order to allow adaptive SRS repetitions spacing for different channel, UE characteristics, deployment scenario combinations, and/or for different Doppler parameters estimation with a high level of accuracy and robustness. Moreover, a base station 110 may be unable to configure SRS resource sets that include SRS resources that have different temporal spacings. Therefore, current SRS configurations may be unable to provide a required flexibility needed to enable a base station 110 to perform different uplink Doppler parameter estimations in a robust and accurate way. For example, to enable different Doppler parameter estimations (e.g., that are associated with different time gaps or pilot spacings), a base station 110 may need to configure a first SRS resource set for a first Doppler parameter estimation and a second SRS resource set for a second Doppler parameter estimation. However, even with the two SRS resource sets, it may not be possible for each of the SRS resource sets to be configured with an optimal time gap for Doppler parameter estimation. Moreover, this increases overhead associated with transmitting SRSs and performing the Doppler parameter estimations, because additional SRSs will need to be transmitted by the UE 120 (e.g., using the different SRS resource set configurations, such as transmitting 4 SRS symbols).

Figure 6:
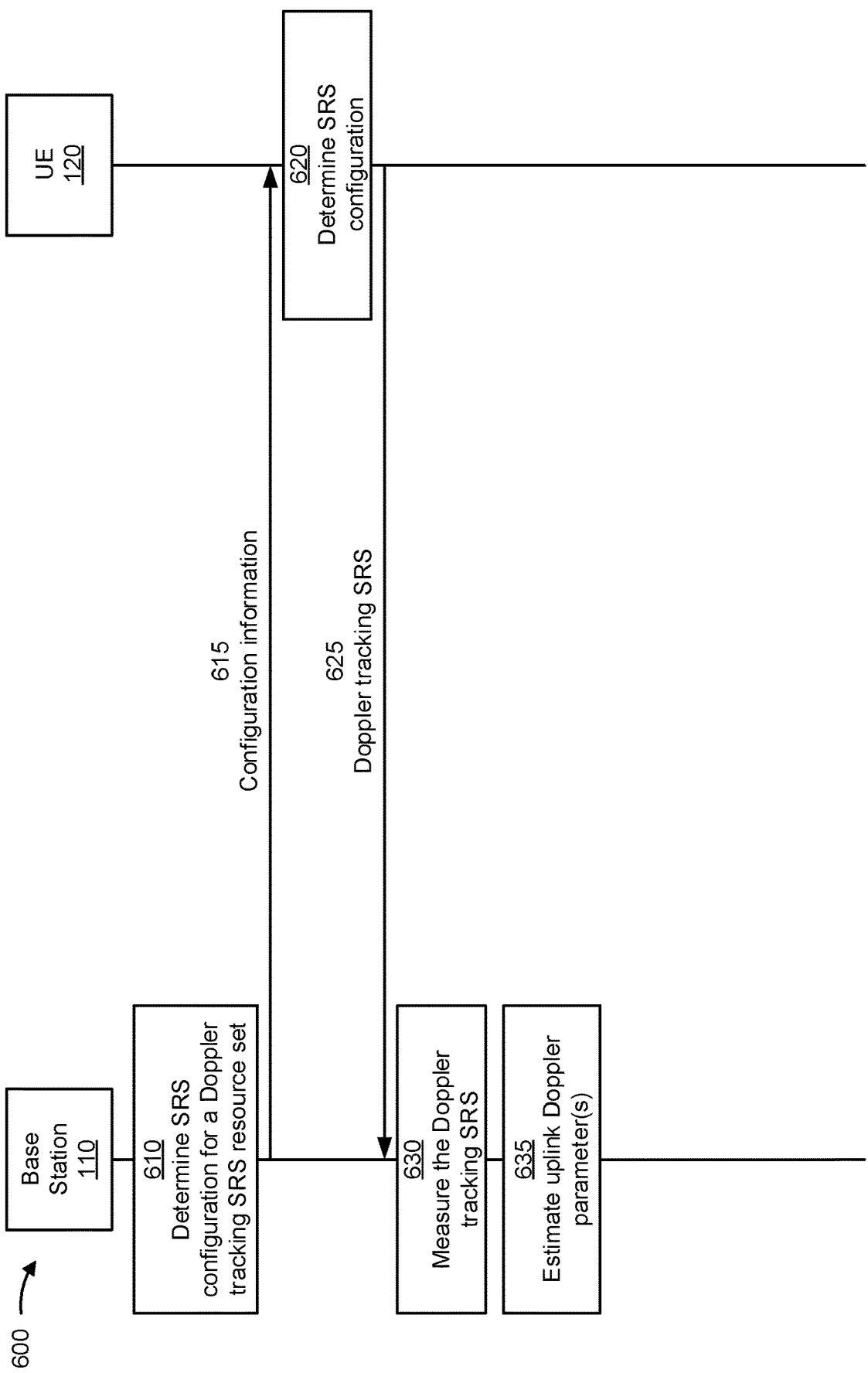
FIG. 6 is a diagram illustrating an example associated with configurations and dynamic signaling for Doppler tracking SRS resource sets.

FIG. 6 is a diagram illustrating an example 600 associated with configurations and dynamic signaling for Doppler tracking SRS resource sets. As shown in FIG. 6, a base station 110 and a UE 120 may communicate with one another in a wireless network, such as the wireless network 100.

Example 600 may be associated with configurations for Doppler tracking SRS resource sets that are to be used by the base station 110 to measure and/or estimate uplink Doppler parameters. "Doppler tracking SRS" may refer to an SRS that can be used by a base station 110 to measure or estimate uplink Doppler spread and/or uplink Doppler shift or uplink frequency offset. For example, an additional SRS usage type may be defined, associated with a Doppler tracking SRS. For example, a Doppler tracking SRS resource set may be used by a base station 110 to estimate an uplink Doppler shift and/or an uplink Doppler spread. As described in more detail elsewhere herein, the SRS resource set may include multiple SRS resources (e.g., within a single slot) that have a temporal spacing between the SRS resources (e.g., the multiple SRS resources within the single slot may be non-contiguous). In other words, the multiple SRS resources may be associated with non-consecutive OFDM symbols within a single slot. To enable accurate Doppler parameter estimations, the UE 120 should transmit the multiple SRS resources using the same (or approximately the same) phase. However, in some cases, a UE 120 may not be capable of maintaining a phase coherence or a phase continuity between transmissions of the multiple SRS resources. Therefore, the configurations described herein may be based at least in part on a capability of the UE 120 (e.g., the capability to support one or more SRS configurations as described herein, the capability to support a repetitive pattern of an SRS signal with a particular spacing between repetitions and phase coherency between the repetitions), the type of UE 120, and/or the mobility status of the UE 120, among other factors and deployment parameters (such as a subcarrier spacing or carrier frequency).

At 610, the base station 110 may determine an SRS configuration for a Doppler tracking SRS resource set. In some aspects, the base station 110 may determine the SRS configuration based at least in part on a capability of the UE 120 (e.g., a phase coherency capability or a capability to support Doppler tracking SRS resource sets). In some aspects, the base station 110 may determine the SRS configuration based at least in part on a carrier frequency, a subcarrier spacing, a type of deployment, a channel condition, a channel type, and/or movement information associated with the UE 120, among other examples. In some aspects, the base station 110 may determine the SRS configuration base station 110. For example, the base station 110 may determine a configuration for one or more SRS resources (or SRS resource identifiers) associated with the SRS resource set.

For example, the base station 110 may select or determine an SRS configuration to be associated with SRS resources with optimized time gaps (or pilot spacings) for one or more uplink Doppler parameter estimations. As described in more detail elsewhere herein, an optimized time gap (or pilot spacing) for an uplink Doppler parameter estimation may be based at least in part on the Doppler parameter to be estimated, a carrier frequency, a subcarrier spacing, a channel condition, a channel type, and/or movement information associated with the UE 120, among other examples. For example, in scenarios in which the base station 110 is to estimate both uplink Doppler shift and uplink Doppler spread, the base station 110 may select or determine an SRS configuration to include SRS resources with a first time gap (or pilot spacing) for an uplink Doppler shift estimation and a second time gap (or pilot spacing) for an uplink Doppler spread estimation. For example, within a slot, the base station 110 may determine starting symbol locations (e.g., intra-slot starting locations) for different SRS resources included in the SRS resource set. "Intra-slot start position" may refer to a starting OFDM symbol location within a slot where an SRS corresponding to the SRS resource identifier is to be transmitted by the UE 120. The base station 110 may determine the starting symbol locations for the different SRS resources to optimize one or more time gaps for different uplink Doppler parameter estimations. In this way, the base station 110 may be enabled to select or determine an SRS configuration that is optimized for multiple Doppler parameter estimations (e.g., that includes different time gaps between different SRS resources to enable base station 110 to perform multiple Doppler parameter measurements and/or estimations using the same SRS resource set).

At 615, the base station 110 may transmit, and the UE 120 may receive, configuration information for an SRS resource set. For example, the base station 110 may transmit the configuration information using an RRC message (e.g., the configuration for the SRS resource set may be an RRC configuration). In some aspects, the configuration information may partially be indicated by another message. For example, for an aperiodic SRS resource set (and aperiodic SRS resources included in the SRS resource set), the base station 110 may transmit DCI triggering for the aperiodic SRS resource set. Therefore, in some cases, some of the configuration information or updated configuration information may be indicated by the DCI (e.g., rather than all of the configuration information being determined based at least in part on an RRC configuration). Similarly, the configuration information may be partially indicated by a MAC-CE message (e.g., for semi-persistent SRS resources).

In some aspects, the configuration information may indicate a use type for the SRS resource set that is associated with Doppler tracking (e.g., indicating that the SRS resource set is to be used for uplink Doppler parameter estimation). For example, the configuration information may indicate the Doppler tracking usage in an SRS-SetUse information element or a usage information element. The use type for the SRS resource set may be indicated in an RRC configuration using a higher layer parameter.

In some aspects, the configuration information may indicate one or more SRS resource identifiers. For example, the configuration information may indicate one or more SRS resource identifiers in an SRS-ResourceIDList information element. In some aspects, the configuration information may indicate multiple SRS resource identifiers (e.g., for each SRS resource or symbol associated with the SRS resource set). In some other aspects, the configuration information may indicate a single SRS resource identifier that is associated with multiple SRS resources or symbols.

For example, in a first configuration type, the configuration information may indicate two or more SRS resource identifiers associated with the SRS resource set. The configuration information may indicate, for each SRS resource identifier of the two or more SRS resource identifiers, an indication of an intra-slot start position for an SRS resource associated with each SRS resource identifier of the two or more SRS identifiers. In other words, the two or more SRS resource identifiers may be configured with the same configuration, excluding the intra-slot location of the SRS resources. For example, the configuration information may indicate the intra-slot start position for each SRS resource identifier using a startPosition information element (e.g., associated with a resourceMapping information element). In the first configuration type, each SRS resource identifier may be configured as a single port transmission (e.g., using a nrofSRS-Ports information element). In some other aspects, one or more SRS resource identifiers may be configured as a multiple (e.g., two or more) port transmission. For example, for a first frequency band (e.g., an FR1 frequency band), each SRS resource identifier may be configured as a single port transmission. For a second frequency band or bands associated with a high frequency (e.g., an FR2 frequency band another band associated with a frequency range that is higher than the FR2 frequency band), one or more SRS resource identifiers may be configured as a multiple (e.g., two or more) port transmission. In the first configuration type, each SRS resource identifier may be configured as a single symbol transmission (e.g., using an nrofSymbols information element associated with a resourceMapping information element).

In a second configuration type, the configuration information may indicate one or more (e.g., N) SRS resource identifiers associated with the SRS resource set. The configuration information may indicate, for each SRS resource identifier, an indication of an intra-slot start position for an SRS resource associated with the SRS resource identifier (e.g., using a startPosition information element associated with a resourceMapping information element). In some aspects, the configuration information may indicate, for each SRS resource identifier, an indication of a number of repetitions for an SRS resource associated with the SRS resource identifier (e.g., using a repetitionFactor information element associated with the resourceMapping information element). In some aspects, the configuration information may indicate, for each SRS resource identifier, an indication of a number of symbols for an SRS resource associated with the SRS resource identifier (e.g., using a nrofSymbols information element associated with a resourceMapping information element) which may be configured consistently with the repetitionFactor information element. For example, in the SRS resource configuration, repetitions may be configured on the consecutive symbols (e.g., an SRS resource configured with 2 symbols and 2 repetitions may occupy 2 consecutive and repetitive OFDM symbols. In the second configuration type, the SRS resource identifiers may be associated with 1 or 2 symbols and 1 or 2 repetitions correspondingly (e.g., each SRS resource identifier may be configured to occupy 1 OFDM symbol or 2 OFDM symbols using the nrofSymbols information element and the corresponding repetitionFactor information element). In the second configuration type, each SRS resource identifier may be configured as a single port transmission (e.g., using the nrofSRS-Ports information element). In some other aspects, one or more SRS resource identifiers may be configured as a multiple (e.g., two or more) port transmission (e.g., for different frequency bands, in a similar manner as described above in connection with the first configuration type).

In a third configuration type, the configuration information may indicate a single SRS resource identifier associated with the SRS resource set. The SRS resource may be configured using configuration parameters for SRS resource configuration (e.g., as defined, or otherwise fixed, by a wireless communication standard, such as the 3GPP) except for the intra-slot start positions for the SRS resource. For example, rather than indicating a single value for the intra-slot start positions for the SRS resource, the configuration information may indicate multiple values for the intra-slot start positions for the SRS resource (e.g., using a startPosition information element or another information element associated with the resourceMapping information element).

For example, the configuration information may indicate multiple intra-slot start positions associated with the SRS resource identifier using a configuration field associated with the SRS resource identifier. The single configuration field may be capable of conveying multiple values (e.g., may be a multiple value indicator). The number of the multiple intra-slot start positions may (e.g., implicitly) indicate a number of symbols associated with the SRS resource identifier. The multiple intra-slot start positions may indicate intra-slot start positions relative to a last symbol of a slot. For example, if the single intra-slot start position field indicates (2, 4, 7), it may indicate that the Doppler tracking SRS is configured with 3 symbols (e.g., at symbol indices 11, 9, and 6 of a slot) with time gaps of 2 symbols (e.g., between the symbols at symbol indices 9 and 11) and 3 symbols (e.g., between the symbols at symbol indices 6 and 9). For example, in the third configuration type, a number of symbols and/or a number of repetitions may not be indicated and the UE 120 and/or the base station 110 may assume that the number of SRS symbols is implicitly defined by a length of the startPosition information element and that each SRS symbol location defined by the startPosition information element has a single repetition (e.g., the nrofSymbols information element and/or the repetitionFactor information element may not be used for the third configuration type). For example, the configuration information may not indicate information associated with a repetition factor or a number of symbols for the SRS resource identifier (e.g., to conserve signaling overhead and an RRC configuration structure volume, as this information may be implicitly indicated by the multi-valued intra-slot start position field). In the third configuration type, the SRS resource identifier may be configured as a single port transmission (e.g., using the nrofSRS-Ports information element). In some other aspects, the SRS resource identifier may be configured as a multiple (e.g., two or more) port transmission (e.g., for different frequency bands, in a similar manner as described above in connection with the first configuration type).

In a fourth configuration type, the configuration information may indicate a single SRS resource identifier associated with the SRS resource set. The SRS resource may be configured using configuration parameters for SRS resource configuration (e.g., as defined, or otherwise fixed, by a wireless communication standard, such as the 3GPP) except for the intra-slot start position for the SRS resource and an additional indication of occupied symbols for the SRS resource. For example, the additional indication of occupied symbols for the SRS resource may be a bitmap configuration indicating the occupied symbols for the SRS resource identifier (e.g., starting at the symbol location indicated by the intra-slot start position for the SRS resource). For example, non-zero elements included in the bitmap configuration may indicate occupied symbols within a slot starting based at least in part on the symbol indicated by the intra-slot start position. For example, the intra-slot start position may be defined relative to an end of a slot (e.g., relative to a last symbol in a slot). Therefore, an intra-slot start position of "4" may indicate that the starting symbol position is 4 symbols from the end of the slot (e.g., symbol 10 of a slot, assuming the slot has 14 symbols). In some aspects, the bitmap may be indicated using an information element associated with the resourceMapping information element. For example, if the intra-slot start position for the SRS resource indicates a symbol index of 6 and the bitmap indicates (1, 0, 0, 1, 0, 1), then the SRS resource may be configured with three SRS symbols (e.g., at symbol index 7, symbol index 10, and symbol index 12). Additionally, the SRS resource may be associated with a time gap of two symbols and one symbol (e.g., indicated by the elements with a value of zero in the bitmap). In the fourth configuration type, the SRS resource identifier may be configured as a single port transmission (e.g., using the nrofSRS-Ports information element). In some other aspects, the SRS resource identifier may be configured as a multiple (e.g., two or more) port transmission (e.g., for different frequency bands, in a similar manner as described above in connection with the first configuration type).

In some aspects, the bitmap configuration indicating the occupied symbols for the SRS resource identifier may be a constant size regardless of the number of occupied SRS symbols for the SRS configuration. For example, the bitmap configuration may be defined assuming a starting position of a first symbol of a slot and may include a number of elements that is equivalent to a number of symbols in the slot (e.g., may include 14 elements assuming that each slot includes 14 symbols). Therefore, the bitmap configuration may indicate occupied SRS symbols (e.g., using a value of "1" in the bitmap configuration) and may indicate unoccupied SRS symbols (e.g., using a value of "0" in the bitmap configuration) for all symbols in a slot. In such examples, the intra-slot start position may not be included in the SRS configuration. For example, as the bitmap configuration is a constant size and assumes a starting position of a first symbol of a slot, the intra-slot start position may not be needed. For example, the configuration information may not indicate information associated with the intra-slot start position (e.g., to conserve signaling overhead and an RRC configuration structure volume, as this information may be implicitly indicated by the bitmap configuration).

In some aspects, the configuration information may indicate that the SRS resource set is a periodic SRS resource set, an aperiodic SRS resource set, or a semi-persistent SRS resource set (e.g., in any of the first, second, third, or fourth configuration types described above). Similarly, one or more of the SRS resources (e.g., one or more of the SRS resource identifiers) may be configured to be periodic, aperiodic, or semi-persistent. For example, the base station 110 may configure the SRS resource set (or SRS resources) for Doppler tracking to be periodic, semi-persistent, or aperiodic using an information element included in the configuration information.

At 620, the UE 120 may determine the SRS configuration based at least in part on receiving the configuration information. At 625, the UE 120 may transmit, and the base station 110 may receive, a Doppler tracking SRS using SRS resources indicated by the configuration information. For example, the UE 120 may transmit repetitions of the SRS to base station 110 in accordance with the configuration information. In one example, the UE 120 may transmit a set of SRS repetitions in the same subframe or a same slot. For instance, the UE 120 may transmit a first repetition of the SRS in a first symbol location of a slot, transmit a second repetition of the SRS in a second symbol location of the slot, and transmit a third repetition of the SRS in a third symbol location of the slot.

The Doppler tracking SRS repetitions may be transmitted by the UE 120 using a single port (e.g., antenna port or SRS port) or multiple ports (e.g., multiple antenna ports or multiple SRS ports). For example, the UE 120 may be configured to use a single port or may be configured to use multiple ports for the Doppler tracking SRSs. When multiple ports are used, the ports may be quasi co-located to facilitate Doppler parameter estimation. In the case of beam-based transmission, the Doppler tracking SRS repetitions may be transmitted using the same transmission beam and/or the same antenna panel. In some aspects, the Doppler tracking SRS repetitions may be transmitted over the entire bandwidth part assigned to UE 120. Alternatively, the Doppler tracking SRS repetitions may be transmitted over a portion of the bandwidth part assigned to UE 120.

At 630, the base station 110 may measure the Doppler tracking SRS received from the UE 120. For example, the base station 110 may measure a first set (e.g., pair) of SRS repetitions that are received in the same subframe or same slot. For instance, the base station 110 may measure a first repetition pair including the SRS received in a first SRS symbol of a slot and the SRS received in a second SRS symbol of the slot. Additionally, the base station 110 may measure a second set (e.g., pair) of SRS repetitions that are received in the same subframe or same slot. In some aspects, a time gap associated with the first set (e.g., pair) of SRS repetitions may be different than a time gap associated with the second set (e.g., pair) of SRS repetitions (e.g., to enable the base station 110 to estimate different Doppler parameters using the first set of SRS repetitions and the second set of SRS repetitions). In some aspects, the first set of SRS repetitions and the second set of SRS repetitions may include one or more common SRS repetitions or SRS symbols. For example, the configuration information may configure the UE 120 to transmit an SRS on a first symbol, a third symbol, and a sixth symbol of a slot. The first set of SRS repetitions may include the SRS transmitted on the first symbol and the third symbol (e.g., to enable the base station 110 to estimate an uplink Doppler shift). The second set of SRS repetitions may include the SRS transmitted on the first symbol and the sixth symbol (e.g., to enable the base station 110 to estimate an uplink Doppler spread).

At 635, the base station 110 may estimate one or more uplink Doppler parameters using the SRS transmitted by the UE 120. For example, the base station 110 may measure the SRS messages to estimate a Doppler shift or a frequency offset for the uplink channel. Additionally, or alternatively, the base station 110 may measure the SRS messages to estimate a Doppler spread or a time correlation for the uplink channel. For example, the base station 110 may determine a correlation in time between the SRS repetitions based on the measurements performed by the base station 110. In some aspects, the base station 110 may measure a differential phase of a set of SRS repetitions to determine a phase offset between the set (e.g., pair) of SRS repetitions. The base station 110 may estimate a Doppler shift for the uplink channel based at least in part on the measured phase offset or difference.

For example, the base station 110 may use the Doppler tracking SRSs transmitted by the UE 120 for implicit Doppler shift signaling (e.g., in a high mobility scenario, such as in an HST SFN scenario). The base station 110 (e.g., the network) may apply Doppler shift pre-compensation for one or more TRPs in a downlink SFN scenario (e.g., such as when the one or more TRPs are transmitting downlink communications simultaneously using the same time/frequency resources). The Doppler shift pre-compensation may be based at least in part implicit Doppler shift signaling or indication by the UE 120 (e.g., using Doppler tacking SRSs). Additionally, or alternatively, the base station 110 may use the Doppler tracking SRSs transmitted by the UE 120 for improved uplink DMRS configuration determinations or selections.

In some aspects, the base station 110 may determine other characteristics, conditions, parameters, and/or metrics, such as delay spread for the uplink channel, the power level used to transmit the uplink reference signal relative to a power level used to transmit data, and/or a link quality characteristic (e.g., reception SNR) for the uplink channel.

In some aspects, the base station 110 may estimate an uplink Doppler parameter using the Doppler tracking SRS transmitted by the UE 120 using different time gaps to estimate the Doppler parameter. For example, the base station 110 may perform a first estimation for the Doppler parameter using a first time gap associated with the Doppler tracking SRS resource(s) transmitted by the UE 120. The base station 110 may perform a second estimation for the Doppler parameter using a second time associated with the Doppler tracking SRS resource(s) transmitted by the UE 120. The first time gap may be smaller than the second time gap. For example, the first estimation may provide additional robustness with respect to phase ambiguity or Doppler aliasing (e.g., the smaller time gap may mitigate a risk of phase ambiguity or Doppler aliasing), but the first estimation may provide a lower accuracy due to the smaller time gap. The base station 110 may use the first estimation to apply a correction factor to compensate for the frequency offset or Doppler shift estimated from the first estimation (e.g., for the second estimation). In some aspects, the second time gap may be based at least in part on (e.g., may be defined) by an accuracy of the first estimation (e.g., may be deterministic or bounded for each SNR), rather than being defined by a speed range of the UE 120. By using the larger second time gap, an overall accuracy of the uplink Doppler parameter estimation may be improved. Therefore, by estimating the uplink Doppler parameter using the Doppler tracking SRS using the two-step approach described above (e.g., a first coarse estimation and a second fine estimation), an accuracy of the estimation may be improved and the estimation may have improved robustness to phase ambiguity or Doppler aliasing.

As a result, the base station 110 may be enabled to perform accurate and robust Doppler parameter estimation for an uplink channel using a configured Doppler tracking SRS. For example, the base station 110 may be enabled to optimize multiple, different, time gaps between symbols associated with an SRS transmission for Doppler parameter estimation. The base station 110 may be enabled to configure the symbols on which an SRS transmission occurs to optimize the temporal spacing between the SRS transmissions for Doppler parameter estimation. The base station 110 may be enabled to perform different Doppler parameter estimations using the same SRS resource set and the one or more transmission occurrences associated with the SRS resource set. For example, the base station 110 may be enabled to perform uplink Doppler shift estimation using a first time gap associated with the SRS resource set and/or may be enabled to perform uplink Doppler spread estimation using a second (different) time gap associated with the SRS resource set. Accurate uplink Doppler parameter estimation may improve uplink DMRS configuration selection, synchronization loop tracking by the base station 110, pre-compensation of a frequency offset for the downlink channel (for example in the case of an HST SFN scenario where a transmission scheme 1 (e.g., as defined, or otherwise fixed, by a wireless communication standard) and Doppler shift pre-compensation is employed for downlink transmissions), and/or uplink channel estimation and uplink link adaptation, among other examples.

However, in some cases, such as in the example shown in FIG. 6, channel conditions, channel parameters, SNR conditions, UE 120 speeds, and/or deployment parameters may change dynamically over time. Therefore, in some cases, parameters of a Doppler tracking SRS resource set configuration, such as for an aperiodic Doppler tracking SRS resource set configuration, may become suboptimal for estimating uplink Doppler parameters. For example, a number of SRS resources and/or a time gap between SRS resources of an aperiodic Doppler tracking SRS resource set may become suboptimal due to changing channel conditions, channel parameters, SNR conditions, UE 120 speeds, and/or deployment parameters. Reconfiguring the aperiodic Doppler tracking SRS resource set based on the changing conditions may be difficult and time consuming and would require some interruption in Doppler tracking SRS triggering. For example, the aperiodic Doppler tracking SRS resource set may be reconfigured via RRC signaling. However, RRC procedures may be unable to adapt to changes in channel and reception conditions (e.g., because RRC reconfiguration procedures are non-synchronous and associated with high latency and as a result involve an ambiguity during some time period during which SRS transmission/triggering should be avoided).

Figure 7:
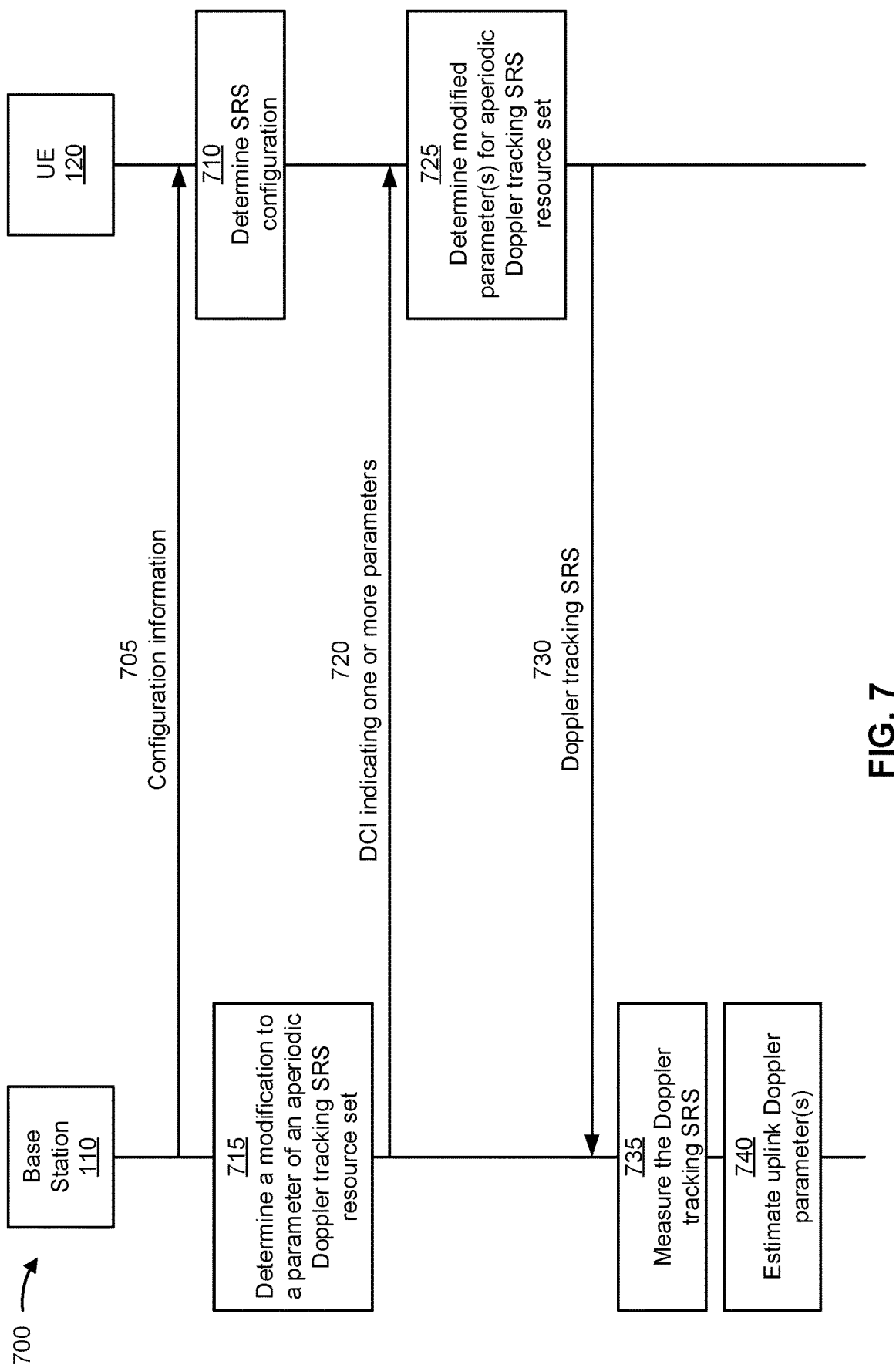
FIG. 7 is a diagram illustrating an example associated with dynamic parameter adaptation for aperiodic Doppler tracking SRS resource sets.
Figure 8:
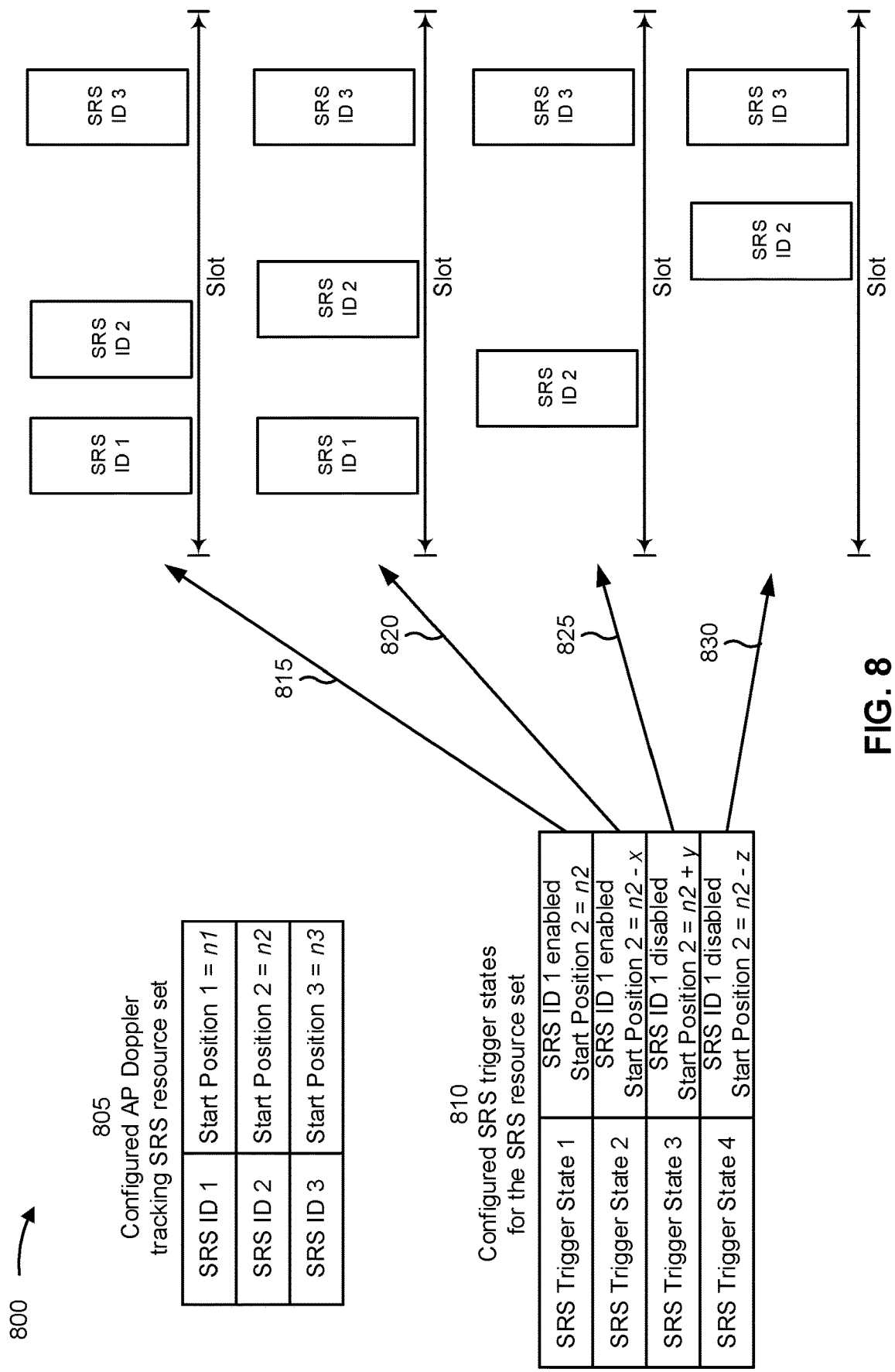
FIG. 8 is a diagram illustrating an example associated with SRS trigger states for an aperiodic Doppler tracking SRS resource set.

Some techniques and apparatuses described herein in connection with FIGS. 7 and 8 enable dynamic parameter adaptation for aperiodic Doppler tracking SRS resource sets. For example, the base station 110 may dynamically adapt one or more parameters for an aperiodic Doppler tracking SRS resource set to modify a time gap (e.g., between two resources or symbols associated with the aperiodic Doppler tracking SRS resource set) and/or a number of resources or symbols to be transmitted for an aperiodic Doppler tracking SRS resource set. The base station 110 may transmit a DCI message (e.g., an SRS triggering DCI message) that indicates the one or more parameters. In some aspects, the DCI may be a non-data-scheduling DCI type (e.g., a DCI that does not schedule a data transmission). In some other aspects, the DCI may be a data-scheduling DCI type (e.g., a DCI that schedules a data transmission). In some aspects, the DCI may indicate an SRS trigger state. The SRS trigger state may indicate (or be configured or associated with) an aperiodic Doppler tracking SRS resource set identifier. In some aspects, the SRS trigger state may additionally indicate one or more parameters associated with the aperiodic Doppler tracking SRS resource set (e.g., explicitly based at least in part on a configuration of the SRS trigger state). Alternatively, the DCI may indicate the SRS trigger state (e.g., that is linked or associated with the aperiodic Doppler tracking SRS resource set) and may indicate (e.g., directly or explicitly) the one or more parameters associated with the aperiodic SRS resource set (e.g., such as when a non-data scheduling DCI is used by the base station 110).

In this way, the base station 110 may dynamically adapt one or more parameters of an aperiodic Doppler tracking SRS resource set. Therefore, the base station 110 may be enabled to modify a time gap between SRS resources associated with the aperiodic Doppler tracking SRS resource set and/or may be enabled to modify a number of SRS resources to be transmitted for the aperiodic Doppler tracking SRS resource set (e.g., the base station 110 may dynamically activate or deactivate SRS resource identifiers or SRS resource(s) of an SRS resource identifier). As a result, uplink Doppler parameter estimations performed using the aperiodic Doppler tracking SRS may be improved. For example, the base station 110 may be enabled to dynamically adapt a time gap between SRS resources (e.g., based at least in part on Doppler parameter(s) to be estimated, channel conditions, channel parameters, SNR conditions, UE 120 speeds, and/or deployment parameters) to optimize the time gap(s) for different Doppler parameter estimations. This may improve an accuracy of Doppler parameter estimations by enabling the base station 110 to configure different time gaps or pilot spacings between SRS resources (e.g., for different Doppler parameter estimations) within the same SRS resource set. Additionally, the base station 110, to reduce an overhead associated with transmitting the Doppler tracking SRS, may be enabled to dynamically indicate different numbers of SRS resources or SRS symbols that may be required to support different Doppler parameter estimations at different time periods or SRS transmission sessions.

As indicated above, FIG. 6 is provided as an example. Other examples may differ from what is described with respect to FIG. 6.

FIG. 7 is a diagram illustrating an example 700 associated with dynamic parameter adaptation for aperiodic Doppler tracking SRS resource sets. As shown in FIG. 7, a base station 110 and a UE 120 may communicate with one another in a wireless network, such as the wireless network 100.

Example 700 may be associated with dynamic parameter adaption for aperiodic Doppler tracking SRS resource sets that are to be used by the base station 110 to measure and/or estimate uplink Doppler parameters. At 705, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC-CE signaling. In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate one or more configurations for SRS resource sets. For example, the configuration information may configure one or more SRS resource sets in a similar manner as described elsewhere herein. In some aspects, the configuration information may indicate configurations for SRS resource sets having different usage types, such as antenna switching, codebook, non-codebook, beam management, and/or positioning, among other examples. Additionally, or alternatively, the configuration information may indicate configurations for one or more Doppler tracking SRS resource sets (e.g., SRS resource sets having a usage type of Doppler tracking). For example, the configuration information may configure one or more Doppler tracking SRS resource sets in a similar (or the same) manner as described in connection with FIG. 6. For example, the configuration information may indicate a configuration for an aperiodic SRS resource set associated with a Doppler tacking usage type for the SRS resource set and a configuration for one or more SRS resource identifiers associated with the SRS resource set, in a similar manner as described in more detail elsewhere herein.

In some aspects, the configuration information may indicate that one or more parameters for an aperiodic Doppler tracking resource set may be changed over time via dynamic signaling from the base station 110. For example, the configuration information may indicate that the base station 110 may transmit SRS scheduling DCI that indicates (e.g., explicitly or implicitly) one or more parameters for the aperiodic Doppler tracking resource set. The configuration information may indicate a DCI type and/or a DCI format to be used by the base station 110 for the dynamic signaling. For example, in some aspects, the configuration information may indicate that the base station 110 is to use a non-data-scheduling DCI type to trigger aperiodic SRS. "Non-data-scheduling DCI type" may refer to a DCI that does not schedule any data transmissions (e.g., PDSCH transmissions and/or PUSCH transmissions) and/or that is not associated with CSI. The non-data-scheduling DCI type may also be referred to as a dummy DCI type. The configuration information may indicate that the non-data-scheduling DCI type may use a format that is similar to the DCI format 0_1, 0_2, 1_1, and/or 1_2, among other examples (e.g., as defined, or otherwise fixed, by a wireless communication standard, such as the 3GPP). Alternatively, the configuration information may indicate that the base station 110 is to use a data-scheduling DCI type (e.g., a DCI type associated with scheduling data transmissions) to trigger aperiodic SRS. The configuration information may indicate that the data-scheduling DCI type may use a DCI format 0_1, 0_2, 1_1, and/or 1_2, among other examples.

In some aspects, the configuration information may indicate information for one or more SRS trigger states. "SRS trigger state" may refer to a configuration for a list of one or more SRS resource sets to be triggered by DCI when the DCI indicates the specific SRS trigger state (e.g., via an SRS request field in the DCI). Different SRS trigger states can be indicated or selected dynamically by the base station 110. For example, the configuration information may map or link each SRS trigger state to a code point for a DCI field (e.g., the SRS request field) or to another indicator. The base station 110 may include the code point or indicator in DCI (e.g., in an SRS request field) to dynamically trigger or select the SRS trigger state linked to or associated with an SRS resource set (or several SRS resource sets). In some aspects, the configuration information may configure a linkage or association of different SRS trigger states to different SRS resource sets having different usage types, such as Doppler tracking, antenna switching, codebook, non-codebook, beam management, and/or positioning, among other examples. In some aspects, for an aperiodic Doppler tracking SRS resource set, the configuration information (e.g., for one or more SRS trigger states) may indicate multiple SRS trigger states associated with or linked to the same aperiodic Doppler tracking SRS resource set. For example, each SRS trigger state associated with the same aperiodic Doppler tracking SRS resource set may include different combinations of configuration parameters for the aperiodic Doppler tracking SRS resource set (e.g., may provide a configuration for different time gaps between SRS resources or SRS symbols and/or may configure one or more SRS resources or SRS resource identifiers to be disabled or deactivated). This may provide additional flexibility to the base station 110 for dynamically modifying time gaps or the number of SRS resources to be transmitted for a specific triggering of an aperiodic Doppler tracking SRS resource set, while also reducing a signaling or dynamic reconfiguration overhead (e.g., as the base station 110 may only need to indicate a code point or indicator associated with the SRS trigger state, rather than providing explicitly the full configuration or parameters associated with the configuration). In some aspects, the configuration information may indicate that one or more SRS trigger states (e.g., from the configured SRS trigger states) are to be activated (e.g., are to be available for selection or use by the base station 110 and/or UE 120). The configuration information may indicate that the base station 110 may modify which SRS trigger states are activated over time (e.g., via MAC-CE signaling).

In some aspects, an SRS trigger state may be linked or mapped to an identifier of an SRS resource set (e.g., of an aperiodic Doppler tracking SRS resource set). Additionally, the SRS trigger state configuration may indicate that an additional indication of one or more parameters of the aperiodic Doppler tracking SRS resource set (e.g., an SRS trigger sate may explicitly indicate some of the configuration parameters for aperiodic Doppler tracking SRS resource set).

The UE 120 may configure the UE 120 for communicating with the base station 110. In some aspects, the UE 120 may configure the UE 120 based at least in part on the configuration information. In some aspects, the UE 120 may be configured to perform one or more operations described herein.

At 710, the UE 120 may determine one or more SRS resource set configurations (e.g., as indicated by the base station 110). For example, the UE 120 may determine or identify the one or more SRS resource set configurations based at least in part on the configuration information. The UE 120 may determine or identify one or more parameters (e.g., start position parameters(s), and/or bitmap parameters or configurations) for SRS resource identifier(s) that indicate intra-slot locations of SRS resources or SRS symbols associated with the SRS resource sets.

At 715, the base station 110 may determine a modification to at least one parameter of an aperiodic Doppler tracking SRS resource set. For example, the base station 110 may determine that a time gap for an aperiodic Doppler tracking SRS resource set (e.g., as indicated or configured by the configuration information) should be modified. For example, the base station 110 may determine a modification to at least one start position parameter (e.g., intra-slot start position parameter) for an SRS resource identifier associated with the aperiodic Doppler tracking SRS resource set. As another example, the base station 110 may determine that one or more SRS resources or SRS resource identifiers should be activated or deactivated. For example, the aperiodic Doppler tracking SRS resource set may be associated with three SRS resources or SRS resource identifiers. The base station 110 may determine that only two SRS resources or SRS resource identifiers are needed for uplink Doppler parameter estimation. Therefore, the base station 110 may determine that one of the SRS resources or SRS resource identifiers associated with the aperiodic Doppler tracking SRS resource set should be deactivated or disabled (e.g., to conserve overhead associated with transmitting the aperiodic Doppler tracking SRS resource set). The base station 110 may determine the modification to at least one parameter of the aperiodic Doppler tracking SRS resource set based at least in part on channel conditions, channel parameters, SNR conditions, UE 120 speeds, uplink Doppler parameter estimations, a type and/or number of uplink Doppler parameter estimations to be performed in a specific estimation session (e.g., at a given time) based on a specific SRS scheduling (e.g., by the base station 110 using the aperiodic Doppler tracking SRS resource set), and/or deployment parameters, among other examples.

At 720, the base station 110 may transmit, and the UE 120 may receive, DCI triggering a transmission of an aperiodic Doppler tracking SRS resource set (e.g., of an SRS resource set identifier for an aperiodic Doppler tracking SRS resource set) associated with the one or more SRS resource identifiers. The DCI may indicate one or more parameters for the SRS resource set (e.g., one or more modified parameters from a configuration of the SRS resource set). For example, the one or more parameters may indicate a modified time gap or a modified number of resources associated with the SRS resource set.

In some aspects, the DCI may use a non-data-scheduling DCI type. The non-data-scheduling DCI type may use a DCI format for scheduling data transmissions (e.g., DCI format 0_0, 0_1, 1_0, and/or 1_1, among other examples), but one or more fields of the DCI format that are associated with scheduling data transmission may not be used and/or may be available for indicating other information. For example, fields associated with indicating a resource allocation (e.g., a time domain resource allocation and/or a frequency domain resource allocation), an MCS, and/or a hybrid automatic repeat request (HARD) process, among other examples, may be available and/or used for indicating other information (e.g., information other than the type of information associated with the field as indicated by the DCI format as defined or otherwise fixed by a wireless communication standard, such as the 3GPP). If a non-data-scheduling DCI type is used, the DCI may indicate an SRS trigger state that is linked or associated with an aperiodic Doppler tracking SRS resource set. Additionally, the DCI may indicate (e.g., explicitly) one or more parameters for the aperiodic Doppler tracking SRS resource set via one or more fields of the DCI. The one or more fields of the DCI may be repurposed fields of the DCI format of the DCI when the DCI format is used as the non-data-scheduling DCI type (e.g., one or more unused or available fields of the DCI format when the DCI is a non-data-scheduling DCI type).

In some aspects, the DCI may indicate (e.g., explicitly) full information for one or more parameters associated with the aperiodic Doppler tracking SRS resource set. For example, if a non-data-scheduling DCI type is used, the DCI may indicate (e.g., explicitly) full information for one or more parameters. In some aspects, the DCI may indicate a start position parameter for at least one SRS resource identifier of one or more SRS resource identifiers associated with the aperiodic Doppler tracking SRS resource set (e.g., if the first configuration type described above in connection with FIG. 6 is used to configure the aperiodic Doppler tracking SRS resource set). For example, the configuration information may indicate a modified start position parameter (e.g., a modified intra-slot start position parameter) that is to be used for the at least one SRS resource identifier (e.g., the start position parameter indicated by the DCI may replace or overwrite, for the transmission triggered by the DCI, a start position parameter for the SRS resource identifier indicated by the configuration information).

In some aspects, the DCI may include an indication to activate or deactivate at least one SRS resource identifier of one or more SRS resource identifiers associated with the aperiodic Doppler tracking SRS resource set (e.g., if the first configuration type described above in connection with FIG. 6 is used to configure the aperiodic Doppler tracking SRS resource set). For example, the DCI may enable or disable one or more SRS resource identifiers associated with the aperiodic Doppler tracking SRS resource set. If an SRS resource identifier is activated or enabled, then the DCI may indicate that an SRS resource associated with the SRS resource identifier is to be transmitted by the UE 120 for the SRS transmission triggered by the DCI. If an SRS resource identifier is deactivated or disabled, then the DCI may indicate that an SRS resource associated with the SRS resource identifier is not to be transmitted by the UE 120 for the SRS transmission triggered by the DCI. For example, the DCI may include a flag or other indicator for a pre-defined SRS resource (e.g., associated with a first or last SRS resource in the time domain as configured by the configuration information). If the flag indicates that the corresponding SRS resource identifier is deactivated or disabled (e.g., if the flag has a value of zero), then the corresponding SRS resource or SRS symbol will not be transmitted for the transmission triggered by the DCI. For example, the at least one SRS resource identifier, that is associated with the flag, may be associated with an SRS resource that occurs first in the time domain, or an SRS resource that occurs last in the time domain, among SRS resources associated with the aperiodic Doppler tracking SRS resource set.

In some aspects, the DCI may include an indication of one or more activated SRS resource identifiers of one or more SRS resource identifiers associated with the aperiodic Doppler tracking SRS resource set (e.g., if the second configuration type described above in connection with FIG. 6 is used to configure the aperiodic Doppler tracking SRS resource set). For example, the indication of one or more activated SRS resource identifiers may include a bitmap. The bitmap may indicate the one or more activated SRS resource identifiers for the triggered transmission of the SRS resource set. For example, the bitmap may have a size of L bits, where a value of L corresponds to the number of SRS resource identifiers associated with the aperiodic Doppler tracking SRS resource set. The SRS trigger state indicated by the DCI may indicate the aperiodic Doppler tracking SRS resource set and the bitmap may indicate a subset of (activated) SRS resource identifiers (from a set of SRS resource identifiers associated with the aperiodic Doppler tracking SRS resource set) that are activated for the SRS transmission triggered by the DCI. SRS resource identifiers that are indicated as activated by the bitmap (e.g., by a value of one in the bitmap) may jointly define the waveform (e.g., the time domain pattern) of the triggered Doppler tracking SRS. In this way, the base station 110 may dynamically adjust time gaps and/or a number of resources associated with the triggered Doppler tracking SRS.

In some aspects, the DCI may include a set of values (e.g., a list of values) for a start position parameter (e.g., an intra-slot start position parameter) for a single SRS resource identifier associated with the aperiodic Doppler tracking SRS resource set (e.g., if the third configuration type described above in connection with FIG. 6 is used to configure the aperiodic Doppler tracking SRS resource set). For example, the configuration information may configure the single SRS resource identifier. The set of values may indicate intra-slot time domain starting locations of SRS symbols for the triggered transmission of the SRS resource set. The set of values indicated by the DCI may be different than a set of values for the start position parameter indicated by the configuration information. In other words, the base station 110 may be enabled to modify a time domain starting location for at least one SRS resource or SRS symbol associated with the SRS resource identifier via the set of values for the start position parameter. A size of the set of values (e.g., a number of elements included in the set of values) indicated by the DCI may be based at least in part on a size of the set of values for the start position parameter indicated by the configuration information. In some aspects, the size of the set of values (e.g., a number of elements included in the set of values) indicated by the DCI may be less than the size of the set of values for the start position parameter indicated by the configuration information. For example, the configuration information may indicate a set of values for the start position parameter, with each value corresponding to an element (e.g., the set of values may correspond to a set of elements). In some aspects, the configuration information may indicate that a subset of elements of the set of elements may be modified by DCI. Therefore, the size of the set of values (e.g., a number of elements included in the set of values) indicated by the DCI may be based at least in part on a number of elements included in the subset of elements (e.g., the subset of elements that can be modified by DCI as indicated by the configuration information).

In some aspects, the set of values for the start position parameter may include one or more valid values and one or more invalid values. "Valid value" may refer to an intra-slot start location that is possible or available (e.g., based at least in part on a slot format and/or a number of symbols in each slot). "Invalid value" may refer to an intra-slot start location that is unavailable or not possible (e.g., based at least in part on the slot format and/or the number of symbols in each slot). For example, if there are 14 symbols in each slot, then values between 0 and 13 may be valid values for the start position parameter. A value of 14 or higher may be an invalid value for the start position parameter when there are 14 symbols in each slot because a value of 14 would indicate a starting location in a different slot. In some aspects, one or more invalid values may be predefined (e.g., in the configuration information). The one or more valid values in the set of values for the start position parameter indicated by the DCI may indicate SRS symbols for the single SRS resource identifier that are to be associated with the triggered transmission of the SRS resource set. The one or more invalid values may indicate SRS symbols for the single SRS resource identifier that are not to be associated with the triggered transmission of the SRS resource set. In other words, if an element in the set of values for the start position parameter includes an invalid value, then a corresponding SRS resource or symbol may be deactivated or disabled for the triggered transmission of the SRS resource set. The number of valid values signaled by the DCI may indicate (e.g., implicitly) the number of SRS symbols to be transmitted for the triggered transmission of the SRS resource set. Similarly, the number of invalid values signaled by the DCI may indicate (e.g., implicitly) the number of deactivated or disabled SRS symbols for the triggered transmission of the SRS resource set. By using invalid values to indicate the deactivated or disabled SRS symbols for the triggered transmission of the SRS resource set, a size of a field used to indicate the set of values for the start position parameter may remain the same regardless of the number of SRS symbols that are activated or deactivated by a given SRS triggering DCI message. Enabling the size of a field used to indicate the set of values for the start position parameter to remain the same may reduce a complexity associated with transmitting (e.g., by the base station 110) and/or decoding (e.g., by the UE 120) the DCI.

In some aspects, the DCI may include an indication of a bitmap, where the bitmap indicates one or more enabled SRS symbols associated with a single SRS resource identifier to be transmitted for a given triggering or scheduling of the aperiodic Doppler tracking SRS resource set (e.g., if the fourth configuration type described above in connection with FIG. 6 is used to configure the aperiodic Doppler tracking SRS resource set). For example, the bitmap may indicate intra-slot starting locations for different SRS resources or SRS symbols associated with the single SRS resource identifier. In some aspects, the DCI may include an indication of the bitmap and an indication of a start position parameter, where the start position parameter indicates an intra-slot time domain starting location for SRS symbols indicated (e.g., enabled or disabled) by the bitmap. In some other aspects, the start position parameter associated with the bitmap may be fixed (e.g., at a first symbol in a slot or at another symbol in the slot) and may not be indicated by the DCI. If a start position parameter is indicated by the DCI, then the value of the start position parameter may define or indicate (e.g., implicitly) a size of the bitmap (e.g., based at least in part on the value of the start position parameter and a number of symbols in each slot). The bitmap indicated by the DCI may be used for the triggered Doppler tracking SRS transmission (e.g., rather than a bitmap indicated by the configuration information for the aperiodic Doppler tracking SRS resource set). The value of the start position parameter and/or the bitmap indicated by the DCI may jointly define the waveform (e.g., the time domain pattern) of the triggered Doppler tracking SRS transmission.

In some aspects, the one or more parameters for the triggered Doppler tracking SRS transmission may be indicated by an SRS trigger state, rather than being explicitly indicated by the DCI. For example, if a data-scheduling DCI type is used by the base station 110 to trigger the Doppler tracking SRS transmission, then the DCI may indicate an SRS trigger state associated with or linked to a Doppler tracking SRS resource set. The SRS trigger state may additionally indicate a configuration and/or the one or more parameters for the triggered Doppler tracking SRS transmission. For example, as described above, multiple SRS trigger states may be configured at the UE 120 (e.g., via the configuration information or another RRC configuration). The configuration of the SRS trigger states may indicate different configuration parameters and/or information similar to the information that may be indicated (e.g., explicitly) by the DCI as described above. For example, an SRS trigger state (e.g., for a Doppler tracking SRS resource set) may indicate a first value for a start position parameter for at least one SRS resource identifier of the one or more SRS resource identifiers and/or an indication of one or more activated SRS resource identifiers of the one or more SRS resource identifiers (e.g., if the first configuration type described above in connection with FIG. 6 is used to configure the aperiodic Doppler tracking SRS resource set). Additionally, or alternatively, an SRS trigger state (e.g., for a Doppler tracking SRS resource set) may indicate a first bitmap indicating one or more activated SRS resource identifiers from the one or more SRS resource identifiers (e.g., if the second configuration type described above in connection with FIG. 6 is used to configure the aperiodic Doppler tracking SRS resource set). Additionally, or alternatively, an SRS trigger state (e.g., for a Doppler tracking SRS resource set) may indicate a set of values for the start position parameter (e.g., if the third configuration type described above in connection with FIG. 6 is used to configure the aperiodic Doppler tracking SRS resource set). Additionally, or alternatively, an SRS trigger state (e.g., for a Doppler tracking SRS resource set) may indicate a second bitmap indicating one or more activated SRS symbols for an SRS resource identifier of the one or more SRS resource identifiers, and/or a second value for the start position parameter indicating an intra-slot start position for SRS symbols indicated by the second bitmap (e.g., if the fourth configuration type described above in connection with FIG. 6 is used to configure the aperiodic Doppler tracking SRS resource set).

In other words, the configuration of an SRS trigger state associated with an aperiodic Doppler tracking SRS resource set triggering may indicate information similar to the information that may be explicitly indicated by the DCI, as described elsewhere herein. An SRS trigger state may be mapped to a code point or other indicator. The code point or indicator may be included in a field of the DCI (e.g., in an SRS request field). Therefore, the DCI may indicate the SRS trigger state and the UE 120 may identify the configuration and/or the one or more parameters for the triggered Doppler tracking SRS transmission based at least in part on the configuration indicated by the triggered SRS trigger state. In some aspects, the base station 110 may configure SRS trigger states for SRS resource sets having other usage types (e.g., in addition to SRS trigger states for SRS resource sets having a Doppler tracking usage type).

For example, the configuration information (or another RRC configuration) may indicate a set of SRS trigger states. The set of SRS trigger states may be associated with a set of SRS resource sets, including the aperiodic Doppler tracking SRS resource set, that can be triggered by the DCI. The set of SRS resource sets may include other Doppler tracking SRS resource sets and/or SRS resource sets having different usage types (e.g., antenna switching, codebook, non-codebook, beam management, and/or positioning). A subset of SRS trigger states, included in the set of the configured SRS trigger states, may be associated with the SRS resource set (e.g., the aperiodic Doppler tracking SRS resource set). Each SRS trigger state included in the subset of SRS trigger states may indicate a different set of parameters for the SRS resource set. In other words, for a single Doppler tracking SRS resource set, multiple SRS trigger states may be configured by the base station 110 (each SRS trigger state will trigger the Doppler tracking SRS resource set but with a different combination of the one or more parameters). For example, each SRS trigger state, from the subset of SRS trigger states, may be configured to be associated with a different time gap and/or a different number of SRS resources or SRS symbols for the Doppler tracking SRS resource set. An example of different SRS trigger states linked to or associated with a single Doppler tracking SRS resource set is depicted and described in more detail in connection with FIG. 8.

The DCI transmitted by the base station 110 may include an indication (e.g., a code point or another indication) associated with an SRS trigger state linked to the aperiodic Doppler tracking SRS resource set triggering. For example, the indication associated with the SRS trigger state may be signaled or included in an SRS request field of the DCI. In some aspects, the field (e.g., the SRS request field) may be a size of two bits (e.g., enabling four different values to be indicated via the field). In some other aspects, the size of the field (e.g., the SRS request field) may be increased (e.g., to be larger than two bits) to enable a larger number of values to be indicated via the field (e.g., and therefore to enable a larger number of SRS trigger states to be indicated via the field). This may provide additional scheduling flexibility for the base station 110 because the number of SRS trigger states that are available to be indicated by the base station 110 via DCI may be increased. If a data-scheduling DCI type is used for the DCI, then the UE 120 may identify the one or more parameters of the triggered Doppler tracking SRS transmission via the configuration of the SRS trigger state. This may conserve resources associated with transmitting the DCI as additional information indicating the one or more parameters may not need to be included in the DCI.

In some aspects, the base station 110 may transmit, and the UE 120 may receive, an indication of a subset of SRS trigger states, from a set of configured SRS trigger states, that are activated. The base station 110 may transmit the indication of the subset of activated SRS trigger states via a MAC-CE message. The base station 110 may indicate the subset of SRS trigger states that may be indicated or selected by the base station 110 via the DCI to trigger an aperiodic SRS transmission. In some aspects, the subset of activated SRS trigger states may include SRS trigger states associated with Doppler tracking SRS resource sets and/or SRS trigger states associated with other usage types. The indication of the subset of activated SRS trigger states may include an indication of a mapping of each SRS trigger state to a code point or other indicator (e.g., that may be included in DCI to indicate the corresponding SRS trigger state). For example, where four values can be indicated via the field of the DCI (e.g. the SRS request field), a first value (e.g., "00") may be mapped to an indication that no SRS resource sets are triggered, a second value (e.g., "01") may be mapped to a first SRS trigger state, a third value (e.g., "10") may be mapped to a second SRS trigger state, and a fourth value (e.g., "11") may be mapped to a third SRS trigger state. Therefore, in such examples, the first SRS trigger state, the second SRS trigger state, and the fourth SRS trigger state may correspond to the subset of four activated SRS trigger states.

The DCI transmitted by the base station 110 may include an indication of an SRS trigger state, from the subset of activated SRS trigger states. The SRS trigger state may indicate at least one of the one or more parameters for the triggered transmission of the Doppler tracking SRS resource set, as described in more detail elsewhere herein (e.g., in addition to a linkage with or an indication of one or more SRS resource set identifiers, where one of the SRS resource set identifiers is associated with an aperiodic Doppler tracking SRS resource set). Signaling the subset of activated SRS trigger states may enable the size of the field of the DCI (e.g. the SRS request field) to be reduced or maintained (e.g., at two bits or similar sizes) because the base station 110 is enabled to semi-statically select the subset of activated SRS trigger states (e.g., which includes less SRS trigger states than the set of configured SRS trigger states). Reducing or maintaining the size of the field of the DCI (e.g. the SRS request field) may conserve overhead associated with transmitting the DCI.

At 725, the UE 120 may determine one or more modified parameters for the triggered aperiodic Doppler tracking SRS resource set. For example, the UE 120 may determine or identify the one or more modified parameters based at least in part on information indicated by the DCI. For example, the DCI may indicate an SRS trigger state. The UE 120 may identify an SRS resource set (e.g., an aperiodic Doppler tracking SRS resource set) associated, or linked, with the SRS trigger state. In some aspects, the UE 120 may determine or identify the one or more modified parameters for the triggered aperiodic Doppler tracking SRS resource set based at least in part on explicit information included in the DCI. In some other aspects, the UE 120 may determine or identify the one or more modified parameters for the triggered aperiodic Doppler tracking SRS resource set based at least in part on a configuration of the indicated SRS trigger state.

At 730, the UE 120 may transmit, and the base station 110 may receive, the SRS (e.g., a Doppler tracking SRS) based at least in part on the one or more parameters (e.g., the one or more parameters indicated by the DCI). For example, the UE 120 may transmit SRS resources or SRS symbols at time domain starting locations within a slot as defined by a start position parameter indicated by the DCI. Additionally, or alternatively, the UE 120 may transmit one or more activated or enabled SRS resources or SRS symbols indicated by the DCI. Additionally, or alternatively, the UE 120 may refrain from transmitting one or more deactivated or disabled SRS resources or SRS symbols indicated by the DCI. In this way, a time gap between SRS resources and/or a number of SRS resource or SRS symbols transmitted by the UE 120 may be dynamically adapted or changed by the base station 110. This may improve Doppler parameter estimation (e.g., as explained in more detail elsewhere herein) and/or may reduce an overhead associated with transmitting the Doppler tracking SRS.

At 735, the base station 110 may measure the Doppler tracking SRS received from the UE 120. For example, the base station 110 may measure a first set (e.g., pair) of SRS repetitions that are received in the same subframe or same slot. The base station 110 may measure the Doppler tracking SRS in a similar manner as described in connection with FIG. 6. In some aspects, a time gap associated with the first set (e.g., pair) of SRS repetitions may be different than a time gap associated with the second set (e.g., pair) of SRS repetitions (e.g., to enable the base station 110 to estimate different Doppler parameters using the first set of SRS repetitions and the second set of SRS repetitions). In some aspects, the first set of SRS repetitions and the second set of SRS repetitions may include one or more common SRS repetitions or SRS symbols. For example, the DCI may trigger the UE 120 to transmit an SRS on a first symbol, a third symbol, and a sixth symbol of a slot. The first set of SRS repetitions may include the SRS transmitted on the first symbol and the third symbol (e.g., to enable the base station 110 to estimate an uplink Doppler shift). The second set of SRS repetitions may include the SRS transmitted on the first symbol and the sixth symbol (e.g., to enable the base station 110 to estimate an uplink Doppler spread).

At 740, the base station 110 may estimate one or more uplink Doppler parameters using the SRS transmitted by the UE 120. For example, the base station 110 may measure the SRS messages to estimate a Doppler shift or a frequency offset for the uplink channel. Additionally, or alternatively, the base station 110 may measure the SRS messages to estimate a Doppler spread or a time correlation for the uplink channel. The base station 110 may estimate the one or more uplink Doppler parameters using the SRS transmitted by the UE 120 in a similar manner as described in connection with FIG. 6.

In some aspects, the base station 110 may estimate an uplink Doppler parameter using the Doppler tracking SRS transmitted by the UE 120 using different time gaps to estimate the Doppler parameter. For example, the base station 110 may perform a first estimation for the Doppler parameter using a first time gap associated with the Doppler tracking SRS resource(s) transmitted by the UE 120. The base station 110 may perform a second estimation for the Doppler parameter using a second time gap associated with the Doppler tracking SRS resource(s) transmitted by the UE 120. The first time gap may be smaller than the second time gap. For example, the first estimation may provide additional robustness with respect to phase ambiguity or Doppler aliasing (e.g., the smaller time gap may mitigate a risk of phase ambiguity or Doppler aliasing), but the first estimation may provide a lower accuracy due to the smaller time gap. The base station 110 may use the first estimation to apply a correction factor to compensate for the frequency offset or Doppler shift estimated from the first estimation (e.g., for the second estimation). In some aspects, the second time gap may be based at least in part on (e.g., may be defined by) an accuracy of the first estimation (e.g., may be bounded for each SNR), rather than being defined by a speed range of the UE 120. By using the larger second time gap, an accuracy of the uplink Doppler parameter estimation may be improved. Therefore, by estimating the uplink Doppler parameter using the Doppler tracking SRS using the two-step approach described above (e.g., a first coarse estimation and a second fine estimation), an accuracy of the estimation may be improved and the estimation may have improved robustness to phase ambiguity or Doppler aliasing.

As a result, the base station 110 may be enabled to perform accurate and robust Doppler parameter estimation for an uplink channel using a configured Doppler tracking SRS. For example, the base station 110 may be enabled to optimize multiple, different, time gaps between symbols associated with an SRS transmission for Doppler parameter estimation dynamically via DCI. The base station 110 may be enabled to configure the symbols on which an SRS transmission occurs to optimize the temporal spacing between the SRS transmissions for Doppler parameter estimation dynamically via DCI. Accurate uplink Doppler parameter estimation may improve uplink DMRS configuration selection, synchronization loop tracking by the base station 110, pre-compensation of a frequency offset for the downlink channel (for example, in a case of an HST SFN scenario where a transmission scheme 1 (e.g., as defined, or otherwise fixed by, a wireless communication standard) and Doppler shift pre-compensation is employed for downlink transmissions), and/or uplink channel estimation and/or uplink link adaptation among other examples.

As described herein, the base station 110 may dynamically adapt one or more parameters of an aperiodic Doppler tracking SRS resource set. Therefore, the base station 110 may be enabled to modify a time gap between SRS resources associated with the aperiodic Doppler tracking SRS resource set and/or may be enabled to modify a number of SRS resources to be transmitted for the aperiodic Doppler tracking SRS resource set (e.g., the base station 110 may dynamically activate or deactivate SRS resource identifiers or SRS resource(s) of an SRS resource identifier). As a result, uplink Doppler parameter estimations performed using the aperiodic Doppler tracking SRS may be improved. For example, the base station 110 may be enabled to dynamically adapt a time gap between SRS resources (e.g., based at least in part on channel conditions, channel parameters, SNR conditions, UE 120 speeds, and/or deployment parameters) to optimize the time gap(s) for different Doppler parameter estimations. This may improve an accuracy of Doppler parameter estimations by enabling the base station 110 to configure different time gaps or pilot spacings between SRS resources (e.g., for different Doppler parameter estimations) within the same SRS resource set. Additionally, the base station 110 may, to reduce an overhead associated with transmitting the Doppler tracing SRS, be enabled to dynamically indicate different numbers of SRS resources or SRS symbols that may be required to support different estimations at different time periods.

As indicated above, FIG. 7 is provided as an example. Other examples may differ from what is described with respect to FIG. 7.

FIG. 8 is a diagram illustrating an example 800 associated with SRS trigger states for an aperiodic Doppler tracking SRS resource set. As shown in FIG. 8, a configuration 805 for an aperiodic (AP) Doppler tracking SRS resource set may include a first SRS resource identifier (SRS ID 1), a second SRS resource identifier (SRS ID 2), and a third SRS resource identifier (SRS ID 3). The first SRS resource identifier may be associated with a first value for the start position parameter (e.g., n1). The second SRS resource identifier may be associated with a second value for the start position parameter (e.g., n2). The third SRS resource identifier may be associated with a third value for the start position parameter (e.g., n3). The configuration 805 for the aperiodic Doppler tracking SRS resource set may be configured in a similar manner as described in connection with FIGS. 6 and 7. The value of the start position parameter may indicate a starting symbol for an SRS resource relative to a last symbol in a slot.

The example 800 depicts an example where the base station 110 dynamically indicates (e.g., implicitly) modified parameters of a triggered aperiodic Doppler tracking SRS resource set using configured SRS trigger states, as explained in more detail elsewhere herein. For example, the base station 110 may transmit a configuration 810 for one or more SRS trigger states associated with the aperiodic Doppler tracking SRS resource set. For example, the configuration 810 may include a first SRS trigger state (SRS trigger state 1), a second SRS trigger state (SRS trigger state 2), a third SRS trigger state (SRS trigger state 3), and a fourth SRS trigger state (SRS trigger state 4). As shown in FIG. 8, the SRS trigger states may indicate whether an SRS resource identifier (e.g., the first SRS resource identifier) indicated by the configuration 805 is enabled (e.g., activated) or disabled (e.g., deactivated). Additionally, or alternatively, the SRS trigger states may indicate a modified value for the start position parameter for one or more of the SRS resource identifiers (e.g., for the second SRS resource identifier in the example 800).

For example, at 815, if the first SRS trigger state is indicated by DCI, the UE 120 may transmit using a resource indicated by the first SRS resource identifier (e.g., because the first SRS trigger state indicates that the first SRS resource identifier is enabled), a resource indicated by the second SRS resource identifier (e.g., at the time domain starting location of n2), and a resource indicated by the third SRS resource identifier. At 820, if the second SRS trigger state is indicated by DCI, the UE 120 may use the resource indicated by the first SRS resource identifier (e.g., because the first SRS trigger state indicates that the first SRS resource identifier is enabled), a resource indicated by the second SRS resource identifier (e.g., at the time domain starting location of n2−x), and the resource indicated by the third SRS resource identifier. For example, the second SRS trigger state may modify the time domain starting location of the resource indicated by the second SRS resource identifier by x symbols. Therefore, the time gap between the resource indicated by the first SRS resource identifier and the resource indicated by the second SRS resource identifier may be increased (e.g., as compared to the SRS transmitted by the UE 120 at 815). Additionally, the time gap between the resource indicated by the second SRS resource identifier and the resource indicated by the third SRS resource identifier may be decreased (e.g., as compared to the SRS transmitted by the UE 120 at 815).

At 825, if the third SRS trigger state is indicated by DCI, the UE 120 may refrain from transmitting using the resource indicated by the first SRS resource identifier because the third SRS trigger state indicates that the first SRS resource identifier is disabled. The UE 120 may transmit using a resource indicated by the second SRS resource identifier (e.g., at the time domain starting location of n2+y), and the resource indicated by the third SRS resource identifier. Therefore, the UE 120 may transmit using less resources (e.g., as compared to the SRS transmitted by the UE 120 at 815 and at 820) because the first SRS resource identifier is disabled. The second SRS trigger state may modify the time domain starting location of the resource indicated by the second SRS resource identifier by y symbols. Therefore, the time gap between the resource indicated by the second SRS resource identifier and the resource indicated by the third SRS resource identifier may be increased (e.g., as compared to the SRS transmitted by the UE 120 at 815 and/or at 820).

At 830, if the third SRS trigger state is indicated by DCI, the UE 120 may refrain from transmitting using the resource indicated by the first SRS resource identifier because the third SRS trigger state indicates that the first SRS resource identifier is disabled. The UE 120 may transmit using a resource indicated by the second SRS resource identifier (e.g., at the time domain starting location of n2−z), and the resource indicated by the third SRS resource identifier. Therefore, the UE 120 may transmit using less resources (e.g., as compared to the SRS transmitted by the UE 120 at 815 and at 820) because the first SRS resource identifier is disabled. For example, the second SRS trigger state may modify the time domain starting location of the resource indicated by the second SRS resource identifier by z symbols. Therefore, the time gap between the resource indicated by the second SRS resource identifier and the resource indicated by the third SRS resource identifier may be decreased (e.g., as compared to the SRS transmitted by the UE 120 at 815, at 820 and/or at 825).

As a result, as shown in FIG. 8, the base station 110 may be enabled to dynamically adjust one or more time gaps between SRS resources associated with an aperiodic Doppler tracking SRS resource set. Additionally, or alternatively, the base station 110 may be enabled to dynamically adjust a number of SRS resources transmitted for the aperiodic Doppler tracking SRS resource set. This may improve uplink Doppler parameter estimations performed by the base station 110 because the time gaps may be dynamically modified using DCI (e.g., which allows a synchronized signaling and is associated with less latency than an RRC reconfiguration that does not allow frequent reconfigurations "on the fly" without some interruption in SRS triggering/ transmission). Additionally, this may conserve resources because the base station 110 may dynamically disable (or enable) SRS resources associated with the aperiodic Doppler tracking SRS resource set as needed by the base station 110 (e.g., a minimum required number of SRS symbols/repetitions is transmitted for every session of aperiodic Doppler tracking SRS transmission). Therefore, the UE 120 may not transmit an SRS resource if the base station 110 does not need the SRS resource for uplink Doppler parameter estimation(s).

As indicated above, FIG. 8 is provided as an example. Other examples may differ from what is described with respect to FIG. 8.

Figure 9:
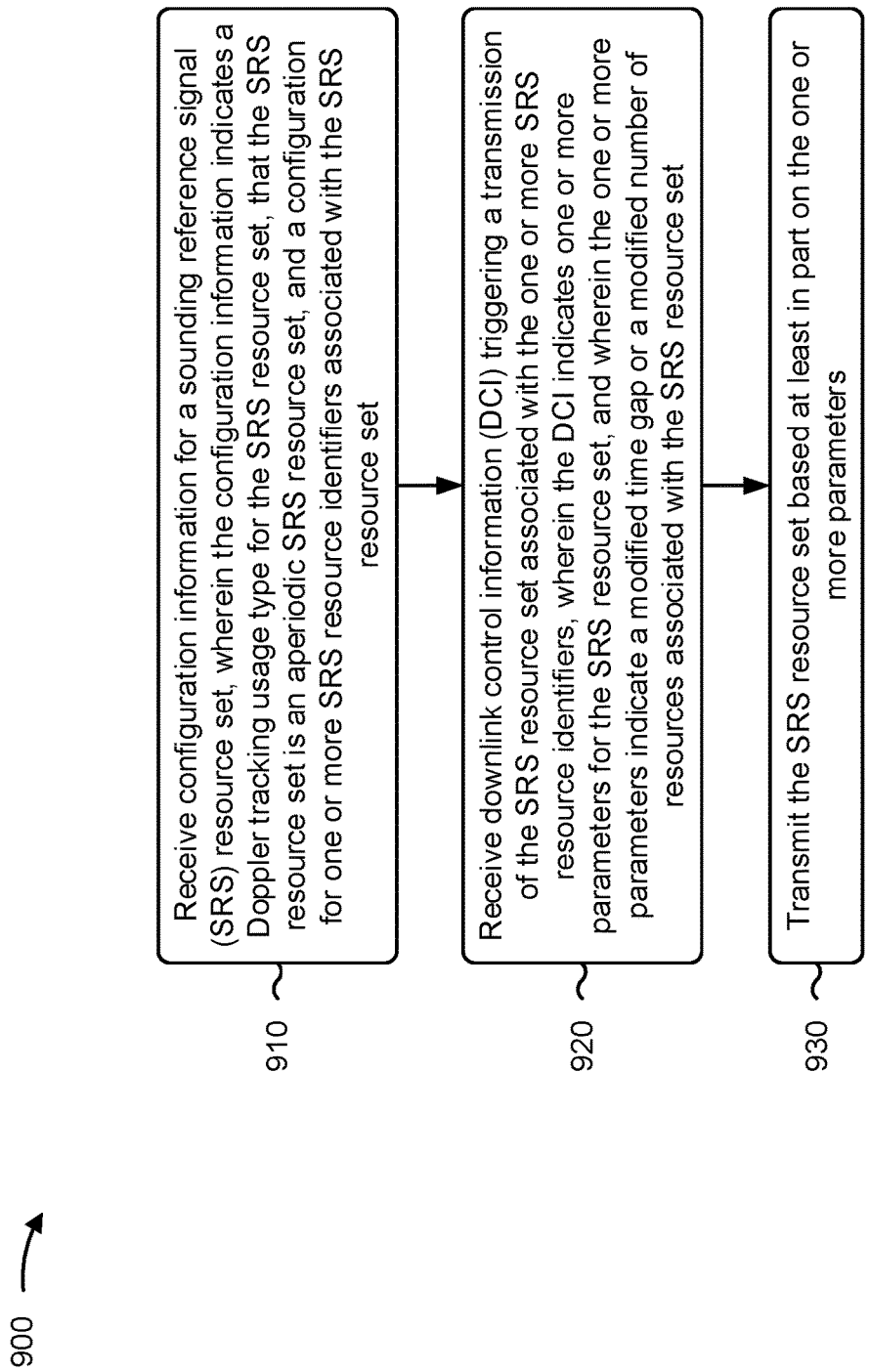
FIGS. 9 and 10 are flowcharts of example methods of wireless communication.

FIG. 9 is a flowchart of an example method 900 of wireless communication. The method 900 may be performed by, for example, a UE (e.g., UE 120).

At 910, the UE may receive configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. For example, the UE (e.g., using communication manager 140 and/or reception component 1102, depicted in FIG. 11) may receive configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set, as described above in connection with, for example, FIG. 7 and at 705. In some aspects, receiving the configuration information includes receiving an indication of one or more SRS trigger states associated with the SRS resource set, wherein an SRS trigger state, of the one or more SRS trigger states, indicates the one or more parameters for the SRS, and wherein each SRS trigger state, of the one or more SRS trigger states, is mapped to a DCI code point of an SRS request field.

At 920, the UE may receive DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. For example, the UE (e.g., using communication manager 140 and/or reception component 1102, depicted in FIG. 11) may receive DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set, as described above in connection with, for example, FIG. 7 and at 720. In some aspects, the DCI uses a non-data-scheduling DCI type. In some aspects, the DCI uses a data-scheduling DCI type.

In some aspects, the DCI uses a non-data-scheduling DCI type, and wherein receiving the DCI comprises receiving an indication of the one or more parameters via one or more fields of the DCI, wherein the one or more fields are repurposed fields of a DCI format of the DCI when the DCI format is used as the non-data-scheduling DCI type.

In some aspects, the DCI uses a non-data-scheduling DCI type, and receiving the DCI includes receiving an indication of a start position parameter for at least one SRS resource identifier of the one or more SRS resource identifiers, and the start position parameter is used for the at least one SRS resource identifier.

In some aspects, the DCI uses a non-data-scheduling DCI type, and receiving the DCI includes receiving an indication to activate or deactivate at least one SRS resource identifier of the one or more SRS resource identifiers. In some aspects, the at least one SRS resource identifier is associated with an SRS resource that occurs first in a time domain, or an SRS resource that occurs last in the time domain, among SRS resources associated with the SRS resource set.

In some aspects, the DCI uses a non-data-scheduling DCI type, and receiving the DCI includes receiving an indication of one or more activated SRS resource identifiers of the one or more SRS resource identifiers. In some aspects, the indication includes a bitmap, wherein the bitmap indicates the one or more activated SRS resource identifiers for the triggered transmission of the SRS resource set.

In some aspects, the DCI uses a non-data-scheduling DCI type, the one or more SRS resource identifiers include a single SRS resource identifier, and receiving the DCI includes receiving a set of values for a start position parameter for the single SRS resource identifier, wherein the set of values indicate intra-slot time domain starting locations of SRS symbols for the triggered transmission of the SRS resource set.

In some aspects, the DCI uses a non-data-scheduling DCI type, the one or more SRS resource identifiers include a single SRS resource identifier, and receiving the DCI includes receiving a set of values for a start position parameter for the single SRS resource identifier, the set of values includes one or more valid values and one or more invalid values, the one or more valid values indicate SRS symbols for the single SRS resource identifier that are to be associated with the triggered transmission of the SRS resource set, and the one or more invalid values indicate SRS symbols for the single SRS resource identifier that are not to be associated with the triggered transmission of the SRS resource set.

In some aspects, the DCI uses a non-data-scheduling DCI type, the one or more SRS resource identifiers include a single SRS resource identifier, and receiving the DCI includes receiving an indication of a bitmap, wherein the bitmap indicates one or more activated SRS symbols associated with the single SRS resource identifier, and the bitmap is used for the triggered transmission of the SRS resource set.

In some aspects, receiving the DCI includes receiving the indication of the bitmap and an indication of a start position parameter, for the triggered transmission of the SRS resource set, and the start position parameter indicates an intra-slot time domain starting location for SRS symbols indicated by the bitmap.

In some aspects, receiving the DCI includes receiving an indication of an SRS trigger state, wherein the SRS trigger state indicates one or more SRS resource set identifies including an identifier of the SRS resource set and the one or more parameters for the triggered transmission of the SRS resource set. In some aspects, the one or more parameters include at least one of a first value for a start position parameter for at least one SRS resource identifier of the one or more SRS resource identifiers, an indication of one or more activated SRS resource identifiers of the one or more SRS resource identifiers, a first bitmap indicating one or more activated SRS resource identifiers from the one or more SRS resource identifiers, a set of values for the start position parameter, a second bitmap indicating one or more activated SRS symbols for an SRS resource identifiers of the one or more SRS resource identifiers, or a second value for the start position parameter indicating an intra-slot start position for SRS symbols indicated by the second bitmap.

In some aspects, the SRS trigger state is included in a set of SRS trigger states indicated by the configuration information, wherein the set of SRS trigger states are associated with a set of SRS resource sets, including the SRS resource set, and wherein a subset of SRS trigger states, included in the set of SRS trigger states, are associated with the SRS resource set, wherein each SRS trigger state included in the subset of SRS trigger states indicates a different set of parameters for the SRS resource set.

In some aspects, receiving the indication of the SRS trigger state includes receiving the indication of the SRS trigger state via an SRS request field of the DCI.

At 930, the UE may transmit the SRS resource set based at least in part on the one or more parameters. For example, the UE (e.g., using communication manager 140 and/or transmission component 1104, depicted in FIG. 11) may transmit the SRS resource set based at least in part on the one or more parameters, as described above in connection with, for example, FIG. 7 and at 730. The UE may transmit the SRS resource set using a start position parameter or activated resources indicated by the DCI.

In some aspects, the configuration information indicates a set of SRS trigger states, and the UE may receive, via a MAC-CE message, an indication of a subset of SRS trigger states, from the set of SRS trigger states, that are activated, and receiving the DCI includes receiving an indication of an SRS trigger state, from the subset of SRS trigger states, wherein the SRS trigger state indicates at least one of the one or more parameters for the triggered transmission of the SRS resource set.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
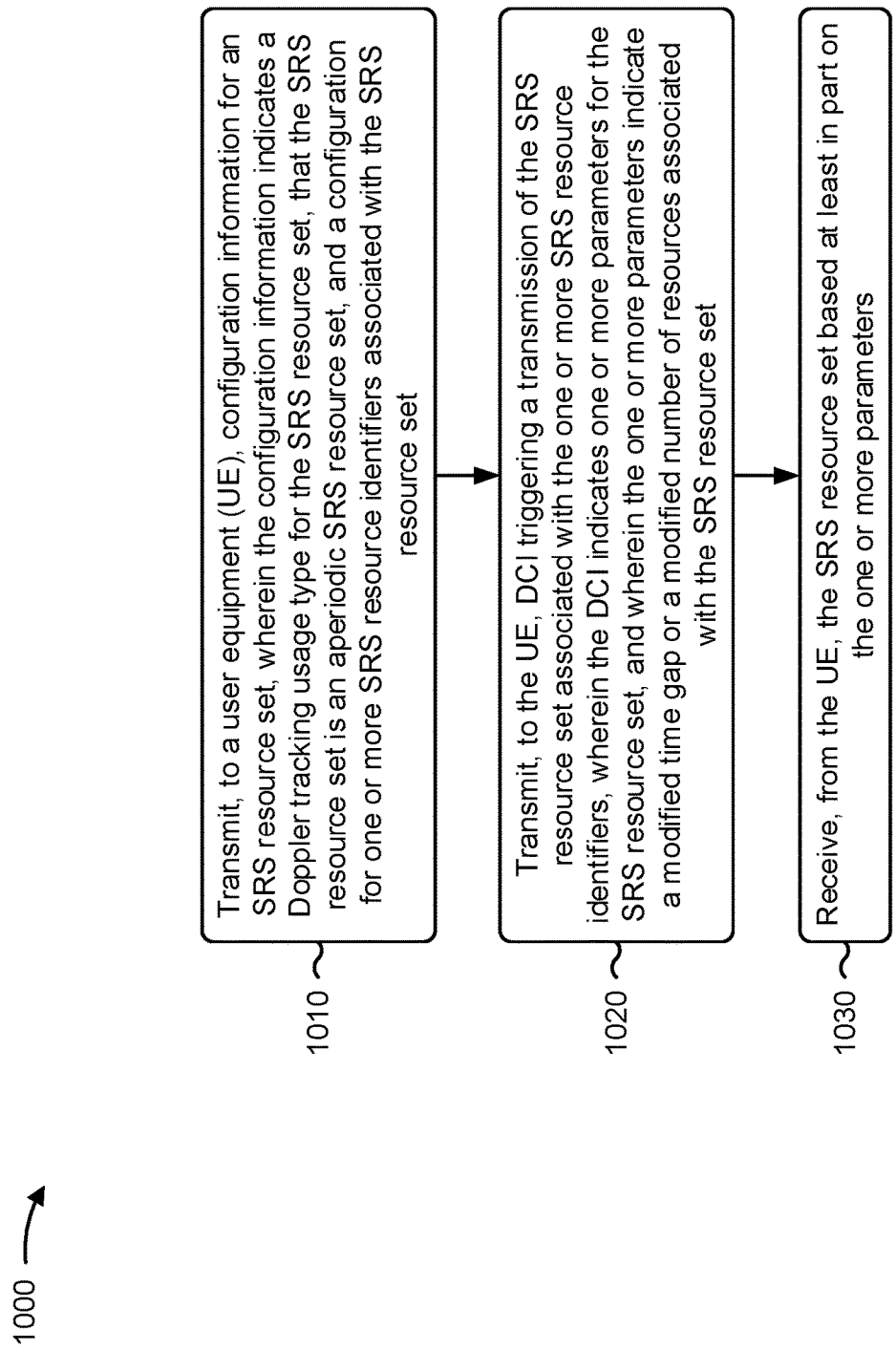

FIG. 10 is a flowchart of an example method 1000 of wireless communication. The method 1000 may be performed by, for example, a base station (e.g., base station 110).

At 1010, the base station may transmit, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. For example, the base station (e.g., using communication manager 150 and/or transmission component 1304, depicted in FIG. 13) may transmit, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set, as described above in connection with, for example, FIG. 7 and at 705. In some aspects, transmitting the configuration information includes transmitting an indication of one or more SRS trigger states associated with the aperiodic SRS resource set, wherein an SRS trigger state, of the one or more SRS trigger states, indicates the one or more parameters for the SRS resource set, and wherein each SRS trigger state, of the one or more SRS trigger states, is mapped to a DCI code point of an SRS request field.

At 1020, the base station may transmit, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. For example, the base station (e.g., using communication manager 150 and/or transmission component 1304, depicted in FIG. 13) may transmit, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set, as described above in connection with, for example, FIG. 7 and at 720. In some aspects, the DCI uses a non-data-scheduling DCI type. In some aspects, the DCI uses a data-scheduling DCI type.

In some aspects, the DCI uses a non-data-scheduling DCI type, and transmitting the DCI includes transmitting an indication of the one or more parameters via one or more fields of the DCI, wherein the one or more fields are repurposed fields of a DCI format of the DCI when the DCI format is used as the non-data-scheduling DCI type.

In some aspects, the DCI uses a non-data-scheduling DCI type, and transmitting the DCI includes transmitting an indication of a start position parameter for at least one SRS resource identifier of the one or more SRS resource identifiers, wherein the start position parameter is used for the at least one SRS resource identifier indicated by the configuration information.

In some aspects, the DCI uses a non-data-scheduling DCI type, and transmitting the DCI includes transmitting an indication to activate or deactivate at least one SRS resource identifier of the one or more SRS resource identifiers. In some aspects, the at least one SRS resource identifier is associated with an SRS resource that occurs first in a time domain, or an SRS resource that occurs last in the time domain, among SRS resources associated with the aperiodic SRS resource set.

In some aspects, the DCI uses a non-data-scheduling DCI type, and transmitting the DCI includes transmitting an indication of one or more activated SRS resource identifiers of the one or more SRS resource identifiers. In some aspects, the indication includes a bitmap, wherein the bitmap indicates the one or more activated SRS resource identifiers for the triggered transmission of the SRS resource set.

In some aspects, the DCI uses a non-data-scheduling DCI type, the one or more SRS resource identifiers include a single SRS resource identifier, and transmitting the DCI includes transmitting a set of values for a start position parameter for the single SRS resource identifier, wherein the set of values indicate intra-slot time domain starting locations of SRS symbols for the triggered transmission of the SRS resource set.

In some aspects, the DCI uses a non-data-scheduling DCI type, the one or more SRS resource identifiers include a single SRS resource identifier, and transmitting the DCI includes transmitting a set of values for a start position parameter for the single SRS resource identifier, wherein the set of values include one or more valid values and one or more invalid values, wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

In some aspects, the DCI uses a non-data-scheduling DCI type, the one or more SRS resource identifiers include a single SRS resource identifier, and transmitting the DCI includes transmitting an indication of a bitmap, wherein the bitmap indicates one or more activated SRS symbols associated with the single SRS resource identifier, and wherein the bitmap is used for the triggered transmission of the SRS resource set.

In some aspects, transmitting the DCI includes transmitting the indication of the bitmap and an indication of a start position parameter for the triggered transmission of the SRS resource set, and the start position parameter indicates an intra-slot time domain starting location for SRS symbols indicated by the bitmap.

In some aspects, transmitting the DCI includes transmitting an indication of an SRS trigger state, wherein the SRS trigger state indicates one or more SRS resource set identifies including an identifier of the SRS resource set and the one or more parameters for the triggered transmission of the SRS resource set. In some aspects, the one or more parameters include at least one of a first value for a start position parameter for at least one SRS resource identifier of the one or more SRS resource identifiers, an indication of one or more activated SRS resource identifiers of the one or more SRS resource identifiers, a first bitmap indicating one or more activated SRS resource identifiers from the one or more SRS resource identifiers, a set of values for the start position parameter, a second bitmap indicating one or more activated SRS symbols for an SRS resource identifiers of the one or more SRS resource identifiers, or a second value for the start position parameter indicating an intra-slot start position for SRS symbols indicated by the second bitmap.

In some aspects, the SRS trigger state is included in a set of SRS trigger states indicated by the configuration information, wherein the set of SRS trigger states are associated with a set of SRS resource sets, including the SRS resource set, and wherein a subset of SRS trigger states, included in the set of SRS trigger states, are associated with the SRS resource set, wherein each SRS trigger state included in the subset of SRS trigger states indicates a different set of parameters for the SRS resource set. In some aspects, transmitting the indication of the SRS trigger state includes transmitting the indication of the SRS trigger state via an SRS request field of the DCI.

At 1030, the base station may receive, from the UE, the SRS resource set based at least in part on the one or more parameters. For example, the base station (e.g., using communication manager 150 and/or reception component 1302, depicted in FIG. 13) may receive, from the UE, the SRS resource set based at least in part on the one or more parameters, as described above in connection with, for example, FIG. 7 and at 730. For example, the base station may receive the SRS resource set using a start position parameter or activated resources indicated by the DCI.

In some aspects, the configuration information indicates a set of SRS trigger states, and the base station may transmit, via a MAC-CE message, an indication of a subset of SRS trigger states, from the set of SRS trigger states, that are activated, and transmitting the DCI includes transmitting an indication of an SRS trigger state, from the subset of SRS trigger states, wherein the SRS trigger state indicates at least one of the one or more parameters for the triggered transmission of the SRS resource set.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
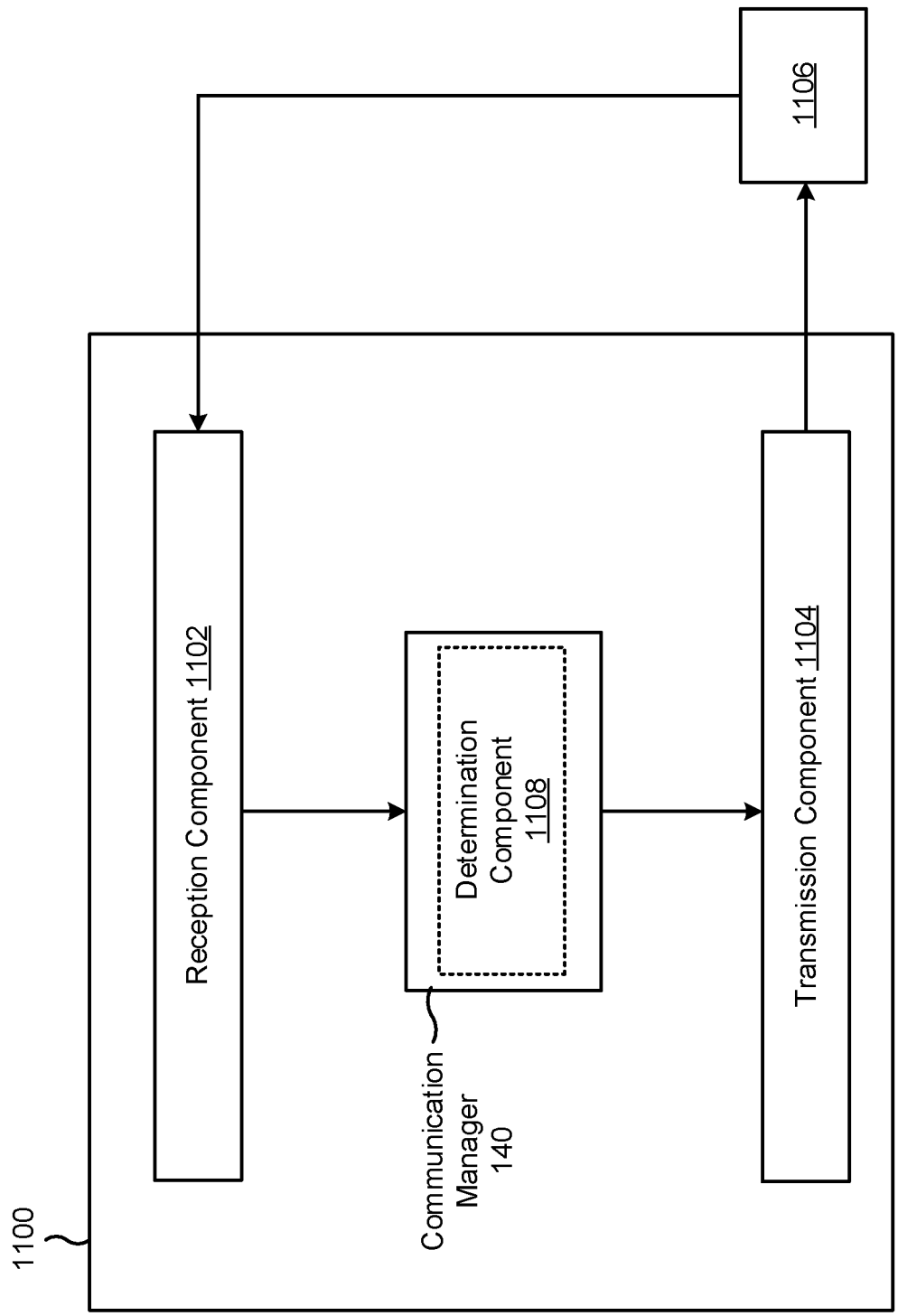
FIG. 11 is a diagram of an example apparatus for wireless communication.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 7 and 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. The reception component 1102 may receive DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The transmission component 1104 may transmit the SRS resource set based at least in part on the one or more parameters.

The determination component 1108 may determine a configuration for the SRS resource set based at least in part on the configuration information. The determination component 1108 may determine the modified time gap or the modified number of resources associated with the SRS resource set based at least in part on receiving the DCI.

The reception component 1102 may receive an indication of the one or more parameters via one or more fields of the DCI, wherein the one or more fields are repurposed fields of a DCI format of the DCI when the DCI format is used as the non-data-scheduling DCI type. The reception component 1102 may receive an indication of a start position parameter for at least one SRS resource identifier of the one or more SRS resource identifiers, wherein the start position parameter is used for the at least one SRS resource identifier. The reception component 1102 may receive an indication to activate or deactivate at least one SRS resource identifier of the one or more SRS resource identifiers.

The reception component 1102 may receive an indication of one or more activated SRS resource identifiers of the one or more SRS resource identifiers. The reception component 1102 may receive a set of values for a start position parameter for the single SRS resource identifier, wherein the set of values indicate intra-slot time domain starting locations of SRS symbols for the triggered transmission of the SRS resource set. The reception component 1102 may receive a set of values for a start position parameter for the single SRS resource identifier, wherein the set of values include one or more valid values and one or more invalid values, wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set. The reception component 1102 may receive an indication of a bitmap, wherein the bitmap indicates one or more activated SRS symbols associated with the single SRS resource identifier, and wherein the bitmap is used for the triggered transmission of the SRS resource set. The reception component 1102 may receive the indication of the bitmap and an indication of a start position parameter, for the triggered transmission of the SRS resource set, wherein the start position parameter indicates an intra-slot time domain starting location for SRS symbols indicated by the bitmap.

The reception component 1102 may receive an indication of one or more SRS trigger states associated with the aperiodic SRS resource set, wherein an SRS trigger state, of the one or more SRS trigger states, indicates the one or more parameters for the SRS, and wherein each SRS trigger state, of the one or more SRS trigger states, is mapped to a DCI codepoint of an SRS request field. The reception component 1102 may receive, via the DCI, an indication of an SRS trigger state, wherein the SRS trigger state indicates one or more SRS resource set identifies including an identifier of the SRS resource set and the one or more parameters for the triggered transmission of the SRS resource set.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
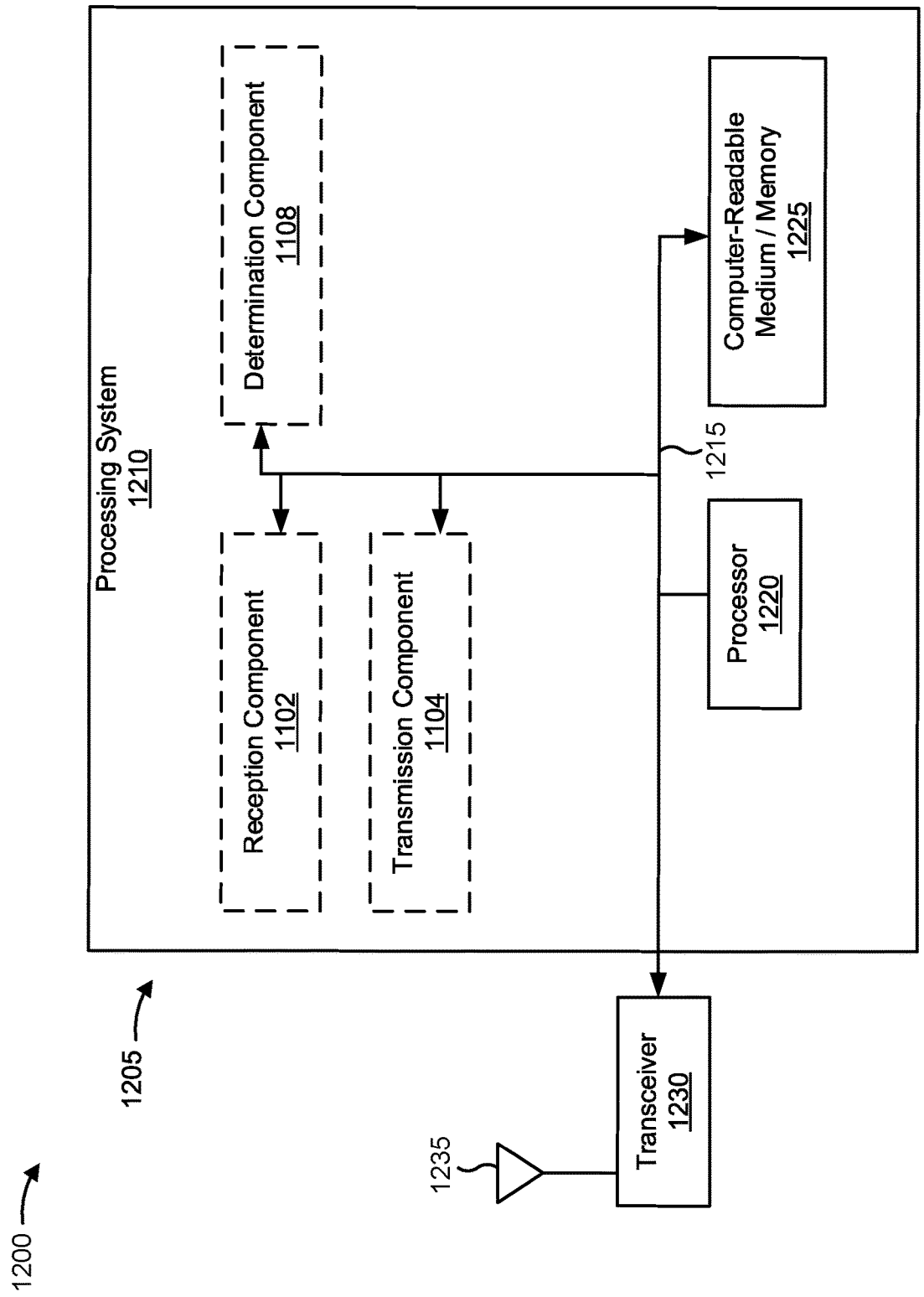
FIG. 12 is a diagram illustrating an example of a hardware implementation for an apparatus employing a processing system.

FIG. 12 is a diagram illustrating an example 1200 of a hardware implementation for an apparatus 1205 employing a processing system 1210. The apparatus 1205 may be a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication includes means for receiving configuration information for an aperiodic SRS resource set, wherein the configuration information indicates a Doppler tracking usage type for the SRS resource set and a configuration for one or more SRS resource identifiers; means for receiving DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and/or means for transmitting the SRS resource set based at least in part on the one or more parameters. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
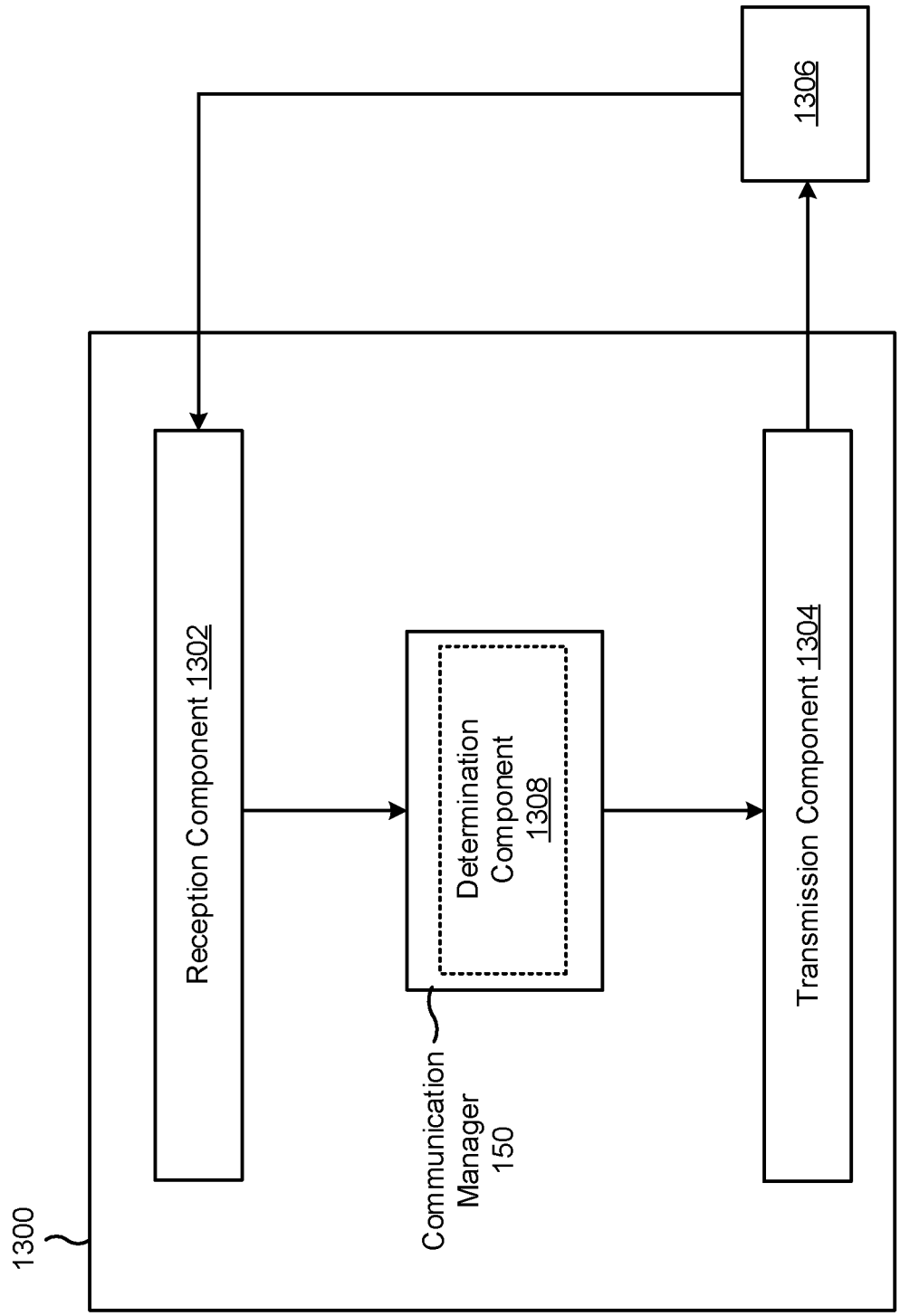
FIG. 13 is a diagram of an example apparatus for wireless communication.

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 7 and 8. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers associated with the SRS resource set. The transmission component 1304 may transmit, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set. The reception component 1302 may receive, from the UE, the SRS resource set based at least in part on the one or more parameters.

The determination component 1308 may determine the configuration information. The determination component 1308 may determine values for the one or more parameters (e.g., that are different than values for the one or more parameters indicated by the configuration information). The determination component 1308 may determine the modified time gap or the modified number of resources associated with the SRS resource set.

The transmission component 1304 may transmit an indication of the one or more parameters via one or more fields of the DCI, wherein the one or more fields are repurposed fields of a DCI format of the DCI when the DCI format is used as the non-data-scheduling DCI type. The transmission component 1304 may transmit an indication of a start position parameter for at least one SRS resource identifier of the one or more SRS resource identifiers, wherein the start position parameter is used for the at least one SRS resource identifier indicated by the configuration information. The transmission component 1304 may transmit an indication to activate or deactivate at least one SRS resource identifier of the one or more SRS resource identifiers. The transmission component 1304 may transmit an indication of one or more activated SRS resource identifiers of the one or more SRS resource identifiers. The transmission component 1304 may transmit a set of values for a start position parameter for the single SRS resource identifier, wherein the set of values indicate intra-slot time domain starting locations of SRS symbols for the triggered transmission of the SRS resource set. The transmission component 1304 may transmit a set of values for a start position parameter for the single SRS resource identifier, wherein the set of values include one or more valid values and one or more invalid values, wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

The transmission component 1304 may transmit an indication of a bitmap, wherein the bitmap indicates one or more activated SRS symbols associated with the single SRS resource identifier, and wherein the bitmap is used for the triggered transmission of the SRS resource set. The transmission component 1304 may transmit the indication of the bitmap and an indication of a start position parameter for the triggered transmission of the SRS resource set, wherein the start position parameter indicates an intra-slot time domain starting location for SRS symbols indicated by the bitmap.

The transmission component 1304 may transmit an indication of one or more SRS trigger states associated with the aperiodic SRS resource set, wherein an SRS trigger state, of the one or more SRS trigger states, indicates the one or more parameters for the SRS resource set, and wherein each SRS trigger state, of the one or more SRS trigger states, is mapped to a DCI codepoint of an SRS request field. The transmission component 1304 may transmit an indication of an SRS trigger state, wherein the SRS trigger state indicates one or more SRS resource set identifies including an identifier of the SRS resource set and the one or more parameters for the triggered transmission of the SRS resource set.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
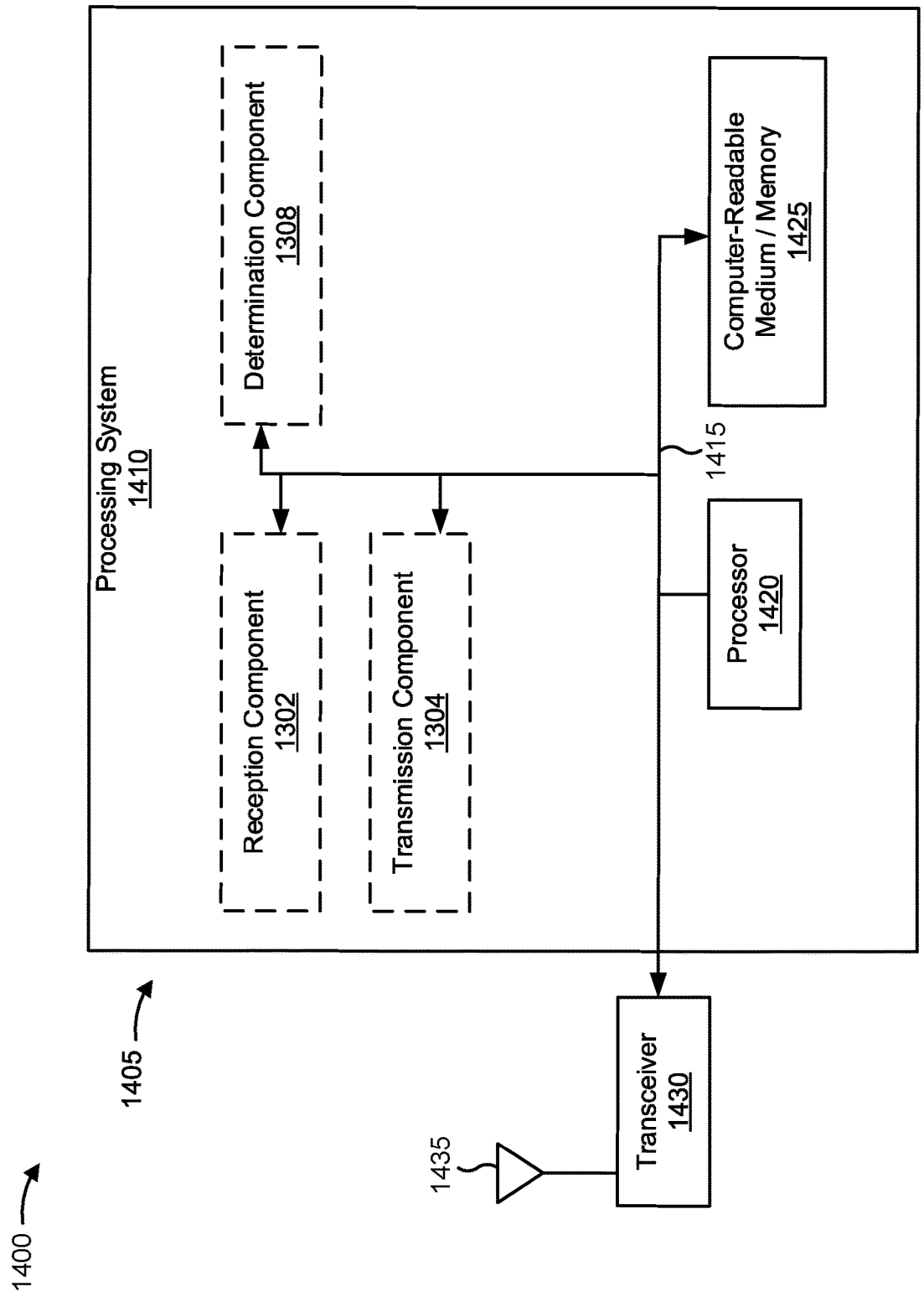
FIG. 14 is a diagram illustrating an example of a hardware implementation for an apparatus employing a processing system.

FIG. 14 is a diagram illustrating an example 1400 of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, and/or power management circuits.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication includes means for transmitting, to a UE, configuration information for an SRS resource set, wherein the configuration information indicates a Doppler tracking usage type for the SRS resource set, that the SRS resource set is an aperiodic SRS resource set, and a configuration for one or more SRS resource identifiers; means for transmitting, to the UE, DCI triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and/or means for receiving, from the UE, the SRS resource set based at least in part on the one or more parameters. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

The following provides an overview of some Aspects of the present disclosure:

Aspect 1: A method of wireless communication performed by a user equipment (UE), comprising: receiving configuration information for a sounding reference signal (SRS) resource set, wherein the configuration information indicates a Doppler tracking usage type for the SRS resource set, that the SRS resource set is an aperiodic SRS resource set, and a configuration for one or more SRS resource identifiers associated with the SRS resource set; receiving downlink control information (DCI) triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and transmitting the SRS resource set based at least in part on the one or more parameters.

Aspect 2: The method of Aspect 1, wherein the DCI uses a non-data-scheduling DCI type.

Aspect 3: The method of Aspect 1, wherein the DCI uses a data-scheduling DCI type.

Aspect 4: The method of any of Aspects 1-2, wherein the DCI uses a non-data-scheduling DCI type, and wherein receiving the DCI comprises: receiving an indication of the one or more parameters via one or more fields of the DCI, wherein the one or more fields are repurposed fields of a DCI format of the DCI when the DCI format is used as the non-data-scheduling DCI type.

Aspect 5: The method of any of Aspects 1-2 and 4, wherein the DCI uses a non-data-scheduling DCI type, and wherein receiving the DCI comprises: receiving an indication of a start position parameter for at least one SRS resource identifier of the one or more SRS resource identifiers, and wherein the start position parameter is used for the at least one SRS resource identifier.

Aspect 6: The method of any of Aspects 1-2 and 4-5, wherein the DCI uses a non-data-scheduling DCI type, and wherein receiving the DCI comprises: receiving an indication to activate or deactivate at least one SRS resource identifier of the one or more SRS resource identifiers.

Aspect 7: The method of Aspect 6, wherein the at least one SRS resource identifier is associated with an SRS resource that occurs first in a time domain, or an SRS resource that occurs last in the time domain, among SRS resources associated with the SRS resource set.

Aspect 8: The method of any of Aspects 1-2 and 4-7, wherein the DCI uses a non-data-scheduling DCI type, and wherein receiving the DCI comprises: receiving an indication of one or more activated SRS resource identifiers of the one or more SRS resource identifiers.

Aspect 9: The method of Aspect 8, wherein the indication includes a bitmap, wherein the bitmap indicates the one or more activated SRS resource identifiers for the triggered transmission of the SRS resource set.

Aspect 10: The method of any of Aspects 1-2 and 4-9, wherein the DCI uses a non-data-scheduling DCI type, wherein the one or more SRS resource identifiers include a single SRS resource identifier, and wherein receiving the DCI comprises: receiving a set of values for a start position parameter for the single SRS resource identifier, wherein the set of values indicate intra-slot time domain starting locations of SRS symbols for the triggered transmission of the SRS resource set.

Aspect 11: The method of any of Aspects 1-2 and 4-10, wherein the DCI uses a non-data-scheduling DCI type, wherein the one or more SRS resource identifiers include a single SRS resource identifier, and wherein receiving the DCI comprises: receiving a set of values for a start position parameter for the single SRS resource identifier, wherein the set of values include one or more valid values and one or more invalid values, wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

Aspect 12: The method of any of Aspects 1-2 and 4-11, wherein the DCI uses a non-data-scheduling DCI type, wherein the one or more SRS resource identifiers include a single SRS resource identifier, and wherein receiving the DCI comprises: receiving an indication of a bitmap, wherein the bitmap indicates one or more activated SRS symbols associated with the single SRS resource identifier, and wherein the bitmap is used for the triggered transmission of the SRS resource set.

Aspect 13: The method of Aspect 12, wherein receiving the DCI comprises: receiving the indication of the bitmap and an indication of a start position parameter, for the triggered transmission of the SRS resource set, and wherein the start position parameter indicates an intra-slot time domain starting location for SRS symbols indicated by the bitmap.

Aspect 14: The method of any of Aspects 1-13, wherein receiving the configuration information comprises: receiving an indication of one or more SRS trigger states associated with the aperiodic SRS resource set, wherein an SRS trigger state, of the one or more SRS trigger states, indicates the one or more parameters for the SRS, and wherein each SRS trigger state, of the one or more SRS trigger states, is mapped to a DCI code point of an SRS request field.

Aspect 15: The method of any of Aspects 1-14, wherein receiving the DCI comprises: receiving an indication of an SRS trigger state, wherein the SRS trigger state indicates one or more SRS resource set identifies including an identifier of the SRS resource set and the one or more parameters for the triggered transmission of the SRS resource set.

Aspect 16: The method of Aspect 15, wherein the one or more parameters include at least one of: a first value for a start position parameter for at least one SRS resource identifier of the one or more SRS resource identifiers, an indication of one or more activated SRS resource identifiers of the one or more SRS resource identifiers, a first bitmap indicating one or more activated SRS resource identifiers from the one or more SRS resource identifiers, a set of values for the start position parameter, a second bitmap indicating one or more activated SRS symbols for an SRS resource identifiers of the one or more SRS resource identifiers, or a second value for the start position parameter indicating an intra-slot start position for SRS symbols indicated by the second bitmap.

Aspect 17: The method of any of Aspects 15-16, wherein the SRS trigger state is included in a set of SRS trigger states indicated by the configuration information, wherein the set of SRS trigger states are associated with a set of SRS resource sets, including the SRS resource set, and wherein a subset of SRS trigger states, included in the set of SRS trigger states, are associated with the SRS resource set, wherein each SRS trigger state included in the subset of SRS trigger states indicates a different set of parameters for the SRS resource set.

Aspect 18: The method of any of Aspects 15-17, wherein receiving the indication of the SRS trigger state comprises receiving the indication of the SRS trigger state via an SRS request field of the DCI.

Aspect 19: The method of any of Aspects 1-18, wherein the configuration information indicates a set of SRS trigger states, the method further comprising: receiving, via a medium access control (MAC) control element (MAC-CE) message, an indication of a subset of SRS trigger states, from the set of SRS trigger states, that are activated; and wherein receiving the DCI comprises: receiving an indication of an SRS trigger state, from the subset of SRS trigger states, wherein the SRS trigger state indicates at least one of the one or more parameters for the triggered transmission of the SRS resource set.

Aspect 20: A method of wireless communication performed by a base station, comprising: transmitting, to a user equipment (UE), configuration information for a sounding reference signal (SRS) resource set, wherein the configuration information indicates a Doppler tracking usage type for the SRS resource set, that the SRS resource set is an aperiodic SRS resource set, and a configuration for one or more SRS resource identifiers associated with the SRS resource set; transmitting, to the UE, downlink control information (DCI) triggering a transmission of the SRS resource set associated with the one or more SRS resource identifiers, wherein the DCI indicates one or more parameters for the SRS resource set, and wherein the one or more parameters indicate a modified time gap or a modified number of resources associated with the SRS resource set; and receiving, from the UE, the SRS resource set based at least in part on the one or more parameters.

Aspect 21: The method of Aspect 20, wherein the DCI uses a non-data-scheduling DCI type.

Aspect 22: The method of Aspect 20, wherein the DCI uses a data-scheduling DCI type.

Aspect 23: The method of any of Aspects 20-21, wherein the DCI uses a non-data-scheduling DCI type, and wherein transmitting the DCI comprises: transmitting an indication of the one or more parameters via one or more fields of the DCI, wherein the one or more fields are repurposed fields of a DCI format of the DCI when the DCI format is used as the non-data-scheduling DCI type.

Aspect 24: The method of any of Aspects 20-21 and 23, wherein the DCI uses a non-data-scheduling DCI type, and wherein transmitting the DCI comprises: transmitting an indication of a start position parameter for at least one SRS resource identifier of the one or more SRS resource identifiers, and wherein the start position parameter is used for the at least one SRS resource identifier indicated by the configuration information.

Aspect 25: The method of any of Aspects 20-21 and 23-24, wherein the DCI uses a non-data-scheduling DCI type, and wherein transmitting the DCI comprises: transmitting an indication to activate or deactivate at least one SRS resource identifier of the one or more SRS resource identifiers.

Aspect 26: The method of Aspect 25, wherein the at least one SRS resource identifier is associated with an SRS resource that occurs first in a time domain, or an SRS resource that occurs last in the time domain, among SRS resources associated with the aperiodic SRS resource set.

Aspect 27: The method of any of Aspects 20-21 and 23-26, wherein the DCI uses a non-data-scheduling DCI type, and wherein transmitting the DCI comprises: transmitting an indication of one or more activated SRS resource identifiers of the one or more SRS resource identifiers.

Aspect 28: The method of Aspect 27, wherein the indication includes a bitmap, wherein the bitmap indicates the one or more activated SRS resource identifiers for the triggered transmission of the SRS resource set.

Aspect 29: The method of any of Aspects 20-21 and 23-28, wherein the DCI uses a non-data-scheduling DCI type, wherein the one or more SRS resource identifiers include a single SRS resource identifier, and wherein transmitting the DCI comprises: transmitting a set of values for a start position parameter for the single SRS resource identifier, wherein the set of values indicate intra-slot time domain starting locations of SRS symbols for the triggered transmission of the SRS resource set.

Aspect 30: The method of any of Aspects 20-21 and 23-29, wherein the DCI uses a non-data-scheduling DCI type, wherein the one or more SRS resource identifiers include a single SRS resource identifier, and wherein transmitting the DCI comprises: transmitting a set of values for a start position parameter for the single SRS resource identifier, wherein the set of values include one or more valid values and one or more invalid values, wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

Aspect 31: The method of any of Aspects 20-21 and 23-30, wherein the DCI uses a non-data-scheduling DCI type, wherein the one or more SRS resource identifiers include a single SRS resource identifier, and wherein transmitting the DCI comprises: transmitting an indication of a bitmap, wherein the bitmap indicates one or more activated SRS symbols associated with the single SRS resource identifier, and wherein the bitmap is used for the triggered transmission of the SRS resource set.

Aspect 32: The method of Aspect 31, wherein transmitting the DCI comprises: transmitting the indication of the bitmap and an indication of a start position parameter for the triggered transmission of the SRS resource set, and wherein the start position parameter indicates an intra-slot time domain starting location for SRS symbols indicated by the bitmap.

Aspect 33: The method of any of Aspects 20-32, wherein transmitting the configuration information comprises: transmitting an indication of one or more SRS trigger states associated with the aperiodic SRS resource set, wherein an SRS trigger state, of the one or more SRS trigger states, indicates the one or more parameters for the SRS resource set, and wherein each SRS trigger state, of the one or more SRS trigger states, is mapped to a DCI code point of an SRS request field.

Aspect 34: The method of any of Aspects 20-33, wherein transmitting the DCI comprises: transmitting an indication of an SRS trigger state, wherein the SRS trigger state indicates one or more SRS resource set identifies including an identifier of the SRS resource set and the one or more parameters for the triggered transmission of the SRS resource set.

Aspect 35: The method of Aspect 34, wherein the one or more parameters include at least one of: a first value for a start position parameter for at least one SRS resource identifier of the one or more SRS resource identifiers, an indication of one or more activated SRS resource identifiers of the one or more SRS resource identifiers, a first bitmap indicating one or more activated SRS resource identifiers from the one or more SRS resource identifiers, a set of values for the start position parameter, a second bitmap indicating one or more activated SRS symbols for an SRS resource identifiers of the one or more SRS resource identifiers, or a second value for the start position parameter indicating an intra-slot start position for SRS symbols indicated by the second bitmap.

Aspect 36: The method of any of Aspects 34-35, wherein the SRS trigger state is included in a set of SRS trigger states indicated by the configuration information, wherein the set of SRS trigger states are associated with a set of SRS resource sets, including the SRS resource set, and wherein a subset of SRS trigger states, included in the set of SRS trigger states, are associated with the SRS resource set, wherein each SRS trigger state included in the subset of SRS trigger states indicates a different set of parameters for the SRS resource set.

Aspect 37: The method of any of Aspects 34-36, wherein transmitting the indication of the SRS trigger state comprises: transmitting the indication of the SRS trigger state via an SRS request field of the DCI.

Aspect 38: The method of Aspect 20-37, wherein the configuration information indicates a set of SRS trigger states, the method further comprising: transmitting, via a medium access control (MAC) control element (MAC-CE) message, an indication of a subset of SRS trigger states, from the set of SRS trigger states, that are activated; and wherein transmitting the DCI comprises: transmitting an indication of an SRS trigger state, from the subset of SRS trigger states, wherein the SRS trigger state indicates at least one of the one or more parameters for the triggered transmission of the SRS resource set.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and one or more processors coupled to the memory, wherein the UE is configured to:
    receive configuration information for a sounding reference signal (SRS) resource set, wherein the configuration information indicates a Doppler tracking usage type for the SRS resource set, that the SRS resource set is an aperiodic SRS resource set, a time gap between repetitions of SRS resources of the aperiodic SRS resource set, and a configuration for one or more SRS resource identifiers associated with the SRS resource set;
        receive downlink control information (DCI) triggering a transmission of the SRS resource set associated with the one or more SRS resource identifiers, wherein the DCI indicates one or more parameters for the SRS resource set, and wherein the one or more parameters indicate a modified time gap between the repetitions of SRS resources of the aperiodic SRS resource set, and wherein, to receive the DCI, the UE is configured to:
        receive a set of values for a start position parameter for a single SRS resource identifier, wherein the set of values include one or more valid values and one or more invalid values; and
    transmit the SRS resource set based at least in part on the one or more parameters.

2. The UE of claim 1, wherein the DCI uses a non-data-scheduling DCI type, and wherein the UE, to receive the DCI, is configured to:
    receive an indication of the start position parameter for at least one SRS resource identifier of the one or more SRS resource identifiers, and wherein the start position parameter is used for the at least one SRS resource identifier.

3. The UE of claim 1, wherein the DCI uses a non-data-scheduling DCI type, and wherein the UE, to receive the DCI, is configured to:
    receive an indication to activate or deactivate at least one SRS resource identifier of the one or more SRS resource identifiers.

4. The UE of claim 1, wherein the DCI uses a non-data-scheduling DCI type, and wherein the UE, to receive the DCI, is configured to:
    receive an indication of one or more activated SRS resource identifiers of the one or more SRS resource identifiers.

5. The UE of claim 4, wherein the indication includes a bitmap, wherein the bitmap indicates the one or more activated SRS resource identifiers for the triggered transmission of the SRS resource set.

6. The UE of claim 1, wherein the DCI uses a non-data-scheduling DCI type, wherein the one or more SRS resource identifiers include the single SRS resource identifier, and wherein the UE, to receive the DCI, is configured to:
    receive a first set of values for the start position parameter for the single SRS resource identifier, wherein the first set of values indicated by the DCI are different than a second set of values indicated by the configuration information and the first set of values indicate intra-slot time domain starting locations of SRS symbols for the triggered transmission of the SRS resource set.

7. The UE of claim 1, wherein the DCI uses a non-data-scheduling DCI type, wherein the one or more SRS resource identifiers include the single SRS resource identifier,
    wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

8. The UE of claim 1, wherein the DCI uses a non-data-scheduling DCI type, wherein the one or more SRS resource identifiers include the single SRS resource identifier, and wherein the UE, to receive the DCI, is configured to:
receive an indication of a bitmap, wherein the bitmap indicates one or more activated SRS symbols associated with the single SRS resource identifier, and wherein the bitmap is used for the triggered transmission of the SRS resource set.

9. The UE of claim 8, wherein the UE, to receive the DCI, is configured to:
receive the indication of the bitmap and an indication of the start position parameter, for the triggered transmission of the SRS resource set, and wherein the start position parameter indicates an intra-slot time domain starting location for SRS symbols indicated by the bitmap.

10. The UE of claim 1, wherein the UE, to receive the DCI, is configured to:
receive an indication of an SRS trigger state, wherein the SRS trigger state indicates one or more SRS resource set identifiers including an identifier of the SRS resource set and the one or more parameters for the triggered transmission of the SRS resource set.

11. The UE of claim 10, wherein the SRS trigger state is included in a set of SRS trigger states indicated by the configuration information, wherein the set of SRS trigger states are associated with a set of SRS resource sets, including the SRS resource set, and wherein a subset of SRS trigger states, included in the set of SRS trigger states, are associated with the SRS resource set, wherein each SRS trigger state included in the subset of SRS trigger states indicates a different set of parameters for the SRS resource set.

12. The UE of claim 1, wherein the configuration information indicates a set of SRS trigger states, wherein the UE is further configured to:
receive, via a medium access control (MAC) control element (MAC-CE) message, an indication of a subset of SRS trigger states, from the set of SRS trigger states, that are activated; and wherein the UE, to receive the DCI, is configured to:
receive an indication of an SRS trigger state, from the subset of SRS trigger states, wherein the SRS trigger state indicates at least one of the one or more parameters for the triggered transmission of the SRS resource set.

13. A network entity for wireless communication, comprising: a memory; and
one or more processors coupled to the memory, wherein the one or more processors are configured to:
transmit, to a user equipment (UE), configuration information for a sounding reference signal (SRS) resource set, wherein the configuration information indicates a Doppler tracking usage type for the SRS resource set, that the SRS resource set is an aperiodic SRS resource set, a time gap between repetitions of SRS resources of the aperiodic SRS resource set, and a configuration for one or more SRS resource identifiers associated with the SRS resource set;
transmit, to the UE, downlink control information (DCI) triggering a transmission of the SRS resource set associated with the one or more SRS resource identifiers, wherein the DCI indicates one or more parameters for the SRS resource set, and wherein the one or more parameters indicate a modified time gap between the repetitions of SRS resources of the aperiodic SRS resource set, and wherein, to transmit the DCI, the network entity is configured to:
transmit a set of values for a start position parameter for a single SRS resource identifier, wherein the set of values include one or more valid values and one or more invalid values; and
receive, from the UE, the SRS resource set based at least in part on the one or more parameters.

14. The network entity of claim 13, wherein the DCI uses a non-data-scheduling DCI type, and wherein the network entity, to transmit the DCI, is configured to:
transmit an indication of the start position parameter for at least one SRS resource identifier of the one or more SRS resource identifiers, and wherein the start position parameter is used for the at least one SRS resource identifier indicated by the configuration information.

15. The network entity of claim 13, wherein the network entity, to transmit the DCI, is configured to:
transmit an indication of an SRS trigger state, wherein the SRS trigger state indicates one or more SRS resource set identifiers including an identifier of the SRS resource set and the one or more parameters for the triggered transmission of the SRS resource set.

16. A method of wireless communication performed by a user equipment (UE), comprising:
receiving configuration information for a sounding reference signal (SRS) resource set, wherein the configuration information indicates a Doppler tracking usage type for the SRS resource set, that the SRS resource set is an aperiodic SRS resource set, a time gap between repetitions of SRS resources of the aperiodic SRS resource set, and a configuration for one or more SRS resource identifiers associated with the SRS resource set;
receiving downlink control information (DCI) triggering a transmission of the SRS resource set associated with the one or more SRS resource identifiers, wherein the DCI indicates one or more parameters for the SRS resource set, and wherein the one or more parameters indicate a modified time gap between the repetitions of SRS resources of the aperiodic SRS resource set, and wherein receiving the DCI comprises:
receiving a set of values for a start position parameter for a single SRS resource identifier, wherein the set of values include one or more valid values and one or more invalid values; and
transmitting the SRS resource set based at least in part on the one or more parameters.

17. The method of claim 16, wherein the DCI uses a non-data-scheduling DCI type, and wherein receiving the DCI comprises:
receiving an indication of the start position parameter for at least one SRS resource identifier of the one or more SRS resource identifiers, and wherein the start position parameter is used for the at least one SRS resource identifier.

18. The method of claim 16, wherein the DCI uses a non-data-scheduling DCI type, and wherein receiving the DCI comprises:
receiving an indication to activate or deactivate at least one SRS resource identifier of the one or more SRS resource identifiers.

19. The method of claim 16, wherein the DCI uses a non-data-scheduling DCI type, and wherein receiving the DCI comprises:
   receiving an indication of one or more activated SRS resource identifiers of the one or more SRS resource identifiers.

20. The method of claim 19, wherein the indication includes a bitmap, wherein the bitmap indicates the one or more activated SRS resource identifiers for the triggered transmission of the SRS resource set.

21. The method of claim 16, wherein the DCI uses a non-data-scheduling DCI type, wherein the one or more SRS resource identifiers include the single SRS resource identifier, and wherein receiving the DCI comprises:
   receiving a first set of values for the start position parameter for the single SRS resource identifier, wherein the first set of values indicated by the DCI are different than a second set of values indicated by the configuration information and the first set of values indicate intra-slot time domain starting locations of SRS symbols for the triggered transmission of the SRS resource set.

22. The method of claim 16, wherein the DCI uses a non-data-scheduling DCI type, wherein the one or more SRS resource identifiers include the single SRS resource identifier wherein the one or more valid values indicate SRS symbols for the single SRS resource identifier that are to be associated with the triggered transmission of the SRS resource set, and wherein the one or more invalid values indicate SRS symbols for the single SRS resource identifier that are not to be associated with the triggered transmission of the SRS resource set.

23. The method of claim 16, wherein the DCI uses a non-data-scheduling DCI type, wherein the one or more SRS resource identifiers include the single SRS resource identifier, and wherein receiving the DCI comprises:
   receiving an indication of a bitmap, wherein the bitmap indicates one or more activated SRS symbols associated with the single SRS resource identifier, and wherein the bitmap is used for the triggered transmission of the SRS resource set.

24. The method of claim 23, wherein receiving the DCI comprises: receiving the indication of the bitmap and an indication of the start position parameter, for the triggered transmission of the SRS resource set, and wherein the start position parameter indicates an intra-slot time domain starting location for SRS symbols indicated by the bitmap.

25. The method of claim 16, wherein receiving the DCI comprises: receiving an indication of an SRS trigger state, wherein the SRS trigger state indicates one or more SRS resource set identifiers including an identifier of the SRS resource set and the one or more parameters for the triggered transmission of the SRS resource set.

26. The method of claim 25, wherein the SRS trigger state is included in a set of SRS trigger states indicated by the configuration information, wherein the set of SRS trigger states are associated with a set of SRS resource sets, including the SRS resource set, and
   wherein a subset of SRS trigger states, included in the set of SRS trigger states, are associated with the SRS resource set, wherein each SRS trigger state included in the subset of SRS trigger states indicates a different set of parameters for the SRS resource set.

27. The method of claim 16, wherein the configuration information indicates a set of SRS trigger states, the method further comprising:
   receiving, via a medium access control (MAC) control element (MAC-CE) message, an indication of a subset of SRS trigger states, from the set of SRS trigger states, that are activated; and wherein receiving the DCI comprises:
   receiving an indication of an SRS trigger state, from the subset of SRS trigger states, wherein the SRS trigger state indicates at least one of the one or more parameters for the triggered transmission of the SRS resource set.

28. A method of wireless communication performed by a network entity, comprising:
   transmitting, to a user equipment (UE), configuration information for a sounding reference signal (SRS) resource set, wherein the configuration information indicates a Doppler tracking usage type for the SRS resource set, that the SRS resource set is an aperiodic SRS resource set, a time gap between repetitions of SRS resources of the aperiodic SRS resource set, and a configuration for one or more SRS resource identifiers associated with the SRS resource set;
   transmitting, to the UE, downlink control information (DCI) triggering a transmission of the SRS resource set associated with the one or more SRS resource identifiers, wherein the DCI indicates one or more parameters for the SRS resource set, and wherein the one or more parameters indicate a modified time gap between the repetitions of SRS resources of the aperiodic SRS resource set, and wherein transmitting the DCI comprises:
   transmitting a set of values for a start position parameter for a single SRS resource identifier, wherein the set of values include one or more valid values and one or more invalid values; and
   receiving, from the UE, the SRS resource set based at least in part on the one or more parameters.

29. The method of claim 28, wherein the DCI uses a non-data-scheduling DCI type, and wherein transmitting the DCI comprises:
   transmitting an indication of the start position parameter for at least one SRS resource identifier of the one or more SRS resource identifiers, and wherein the start position parameter is used for the at least one SRS resource identifier indicated by the configuration information.

30. The method of claim 28, wherein transmitting the DCI comprises:
   transmitting an indication of an SRS trigger state, wherein the SRS trigger state indicates one or more SRS resource set identifiers including an identifier of the SRS resource set and the one or more parameters for the triggered transmission of the SRS resource set.

* * * * *